(12) United States Patent
Basiago et al.

(10) Patent No.: US 7,984,073 B1
(45) Date of Patent: Jul. 19, 2011

(54) SYSTEM AND METHOD FOR PROVIDING SERVICE MANAGEMENT IN A DISTRIBUTED DATABASE SYSTEM

(75) Inventors: Jack Basiago, Toney, AL (US); David B. Ewing, Huntsville, AL (US); Richard S. Walker, Madison, AL (US)

(73) Assignee: Crossroads Systems, Inc., Austin, TX (US)

( * ) Notice: Subject to any disclaimer, the term of this patent is extended or adjusted under 35 U.S.C. 154(b) by 688 days.

(21) Appl. No.: 11/153,873

(22) Filed: Jun. 15, 2005

Related U.S. Application Data

(60) Provisional application No. 60/587,021, filed on Jul. 9, 2004.

(51) Int. Cl.
*G06F 17/30* (2006.01)
(52) U.S. Cl. ........................................ 707/802
(58) Field of Classification Search ........................ None
See application file for complete search history.

(56) References Cited

U.S. PATENT DOCUMENTS

| | | | | |
|---|---|---|---|---|
| 2002/0052947 | A1* | 5/2002 | Duimovich et al. | 709/224 |
| 2002/0095399 | A1* | 7/2002 | Devine et al. | 707/1 |
| 2002/0099818 | A1* | 7/2002 | Russell et al. | 709/224 |
| 2002/0184349 | A1* | 12/2002 | Manukyan | 709/221 |
| 2003/0091002 | A1* | 5/2003 | Oliver et al. | 370/241 |
| 2003/0206620 | A1* | 11/2003 | Taylor | 379/229 |
| 2004/0078461 | A1* | 4/2004 | Bendich et al. | 709/224 |
| 2006/0167973 | A1* | 7/2006 | Ra et al. | 709/203 |
| 2006/0179150 | A1* | 8/2006 | Farley et al. | 709/228 |

* cited by examiner

*Primary Examiner* — Charles Rones
*Assistant Examiner* — Yuk Ting Choi
(74) *Attorney, Agent, or Firm* — Sprinkle IP Law Group

(57) ABSTRACT

Embodiments of the present invention provide a system and method for service management in a distributed database environment. In general, embodiments of the present invention provide a service manager that connects to or is part of a database appliance that collects database performance data in the distributed database system. The database appliance accesses traffic between database clients and database servers and collects a variety of database performance statistics without having to rely on agents at the database clients or database servers. The service manager can access the performance data from the database appliance (locally or over communications link) and archive the performance data. Additionally, the service manager can compare items of the performance data (e.g., specific performance statistics) to user defined thresholds. If a threshold is met, the service manager can notify a user by, for example, sending an email.

27 Claims, 21 Drawing Sheets

SYSTEM AND METHOD FOR PROVIDING SERVICE MANAGEMENT IN A DISTRIBUTED DATABASE SYSTEM

RELATED INFORMATION

The present application claims Under 35 U.S.C. 119(e) priority to and the benefit of U.S. Provisional Patent Application No. 60/587,021, entitled "Database Appliance and Service Manager", filed Jul. 9, 2004 by Ewing et al., which is hereby fully incorporated by reference herein.

TECHNICAL FIELD OF THE INVENTION

The present invention relates to systems of monitoring database transactions and more particularly to a system and method for collecting and reporting information on database communications.

BACKGROUND OF THE INVENTION

Many businesses, governmental organizations, educational institutions and other entities depend on the proper and efficient functioning of distributed database systems. A typical distributed database system setup includes clients that interact with application servers that, in turn, interact with database servers over an internal network. In the e-commerce setting, for example, the clients are typically end user clients (i.e., end user computers) that access e-commerce servers via the World Wide Web. The e-commerce servers translate inputs provided by the end user clients into database queries and forward the database queries to the database servers that process the queries. The e-commerce servers (or other application servers) in this situation act as database clients with respect to the database servers.

Application servers are typically connected to database servers by 100BaseT Ethernet or Gigabit Ethernet and communicate using network protocols such as Transmission Control Protocol/Internet Protocol ("TCP/IP"). Further, the application servers and database servers may use specific application layer protocols to store, retrieve, modify or delete data. For example, many database systems use the Structured Query Language ("SQL") to formulate commands to the database server.

In typical database systems, performance bottlenecks occur from inadequate or slow database response times. To ensure efficiency and identify performance problems, many entities are turning to distributed computer system monitoring applications (database monitoring applications) that monitor various database system statistics. Database monitoring applications usually require installation of software agents at application servers (i.e., database clients) and database servers to monitor the communications between the application servers and database servers, record response times and collect other statistics. This is disadvantageous because it can require the installation and updating of many agents at distributed, potentially geographically remote, application and database servers. Therefore, a need exists for a system for collecting and reporting information from database transactions that can be centrally managed without requiring the overhead associated with installing agents at the application and database servers.

SUMMARY OF THE INVENTION

Embodiments of the present invention provide a system and method for providing service management in a distributed database environment that eliminate or substantially reduce the shortcomings of prior art database management systems that rely on distributed agents for service management.

One embodiment of the present invention includes a service manager that comprises a processor and a computer readable medium accessible by the processor stores a set of computer instructions. The set of computer instructions include instructions executable to retrieve database performance data from a database appliance based on a job description and perform an action on the database performance data based on the job description. The action can include, for example, archiving the database performance data in a service manager repository or comparing the database performance data to a predefined threshold and notifying a user if the threshold is met.

Another embodiment of the present invention includes a method for providing service management comprising accessing database messages sent from a database client to a database server, accessing database messages sent from a database server to a database client and using the accessed messages to collect a statistic on communications, between the database server and the database client. The method can further comprise accessing a job description that comprises an indication set of performance data to be retrieved and an action to be performed on one or more items of the retrieved performance data. The method can further include retrieving the set of performance data specified in the job description and performing the action specified in the job description on the one or more items of retrieved performance data. The retrieved performance data can include the statistic collected by the database appliance.

Yet another embodiment of the present invention includes a computer program product comprising a set of computer instructions stored on a computer readable medium. The set of computer instructions can comprise instructions executable by a processor to connect to a database appliance, access a job description, retrieve database performance data from the database appliance according to the job description and perform an action on the database performance data based on the job description. The database appliance collects performance data at a first network location based on communications between a database client at a second network location and a database server at a third network location.

Yet another embodiment of the present invention includes a system for providing service management in a distributed database environment comprising a database appliance and a service manager. The database appliance is at a first network location and is operable to access database messages communicated on a network between a database client at a second network location and a database server at a third network location and, using the accessed messages, collect database performance data that represents an aspect of the performance of the distributed database environment. The service manager is at a fourth network location and is operable to retrieve the database performance data from the database appliance, compare at least one item of the database performance data to a predefined threshold and generate a notification if the threshold is met.

Another embodiment of the present invention includes a system for providing service management in a distributed database environment comprising a database appliance at a first network location operable to access database messages communicated on a network between a database client at a second network location and a database server at a third network location and, using the accessed messages, collect database performance data that represents an aspect of the performance of the distributed database environment. The system can further include a service manager at a fourth network location operable to retrieve the database performance data from the database appliance based on a job description and archive the database performance data in an, archive according a set of service manager configuration data.

Yet another embodiment of the present invention includes a database appliance with an integrated service manager. The database appliance can comprise a processor and a computer readable medium accessible by the processor storing a set of computer instructions. The set of computer instructions comprise instructions executable by the processor to access database messages on a network, using the accessed messages, collect a set of database performance data, store the set of database performance data in memory, access the set of database performance data from the memory based on a job description and perform and action specified in the job description on the set of database performance data.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein.

DETAILED DESCRIPTION

Preferred embodiments of the invention are illustrated in the FIGURES, like numerals being used to refer to like and corresponding parts of the various drawings.

Embodiments of the present invention provide a system and method for service management in a distributed database environment. In general, embodiments of the present invention provide a service manager that connects to or is part of a database appliance that collects database performance data in the distributed database system. The database appliance accesses traffic (either through port mirroring or acting as proxy) between database clients and database servers and collects a variety of database performance statistics without having to rely on agents at the database clients or database servers. The service manager can access the performance data from the database appliance (locally or over a communications link) and archive the performance data. Additionally, the service manager can compare items of the performance data (e.g., specific performance statistics) to user defined thresholds. If the threshold is met, the service manager can notify a user by, for example, generating an email. This can allow for service level agreement monitoring of the distributed database system without the use of software agents and without requiring that a user constantly monitor the database appliance. The database performance data can include any data that represents some aspect of the performance of distributed database system being monitored including performance of the clients, the servers, interactions between clients and servers and other performance data.

Figure 1:
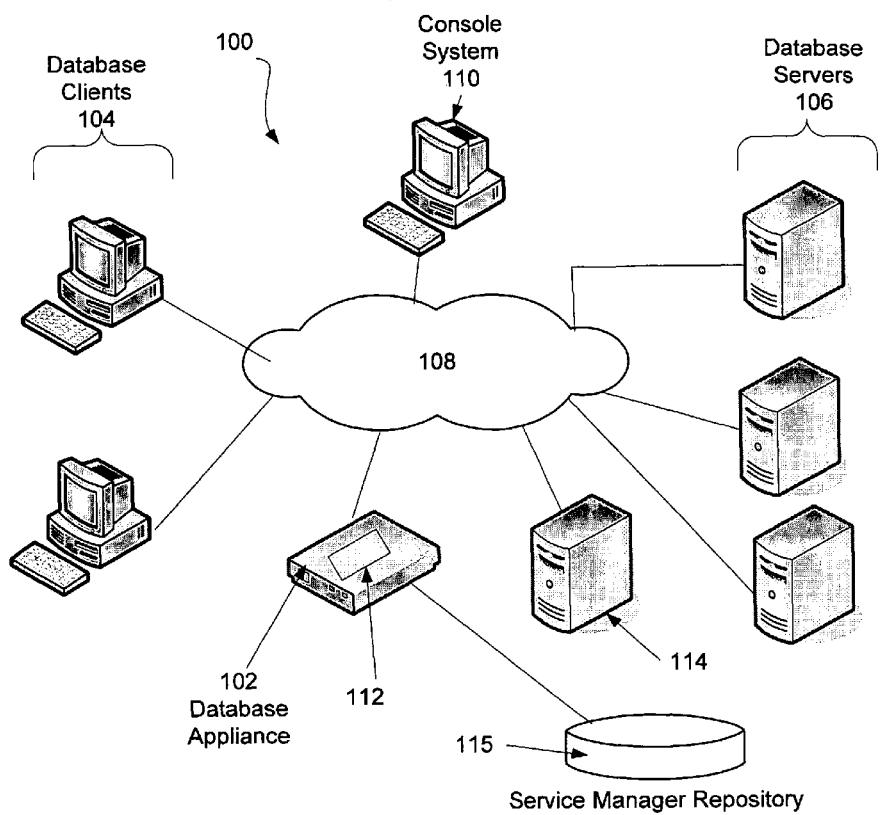
FIG. 1 is a diagrammatic representation of one embodiment of a system implementing an embodiment of, the present invention.

FIG. 1 illustrates an example system 100 including a database appliance 102 according to one embodiment of the present invention. System 100 includes one or more database clients 104 coupled to (i.e., operable to communicate with directly or indirectly) one or more database servers 106 and database appliance 102 via a communications link 108 (e.g., a LAN, WAN, Fibre Channel network, wireless network, global area network, Infiniband Link, Fibre Distributed Data Interface (FDDI), direct wire connection, bus, circuit board or other communications link known or developed in the art). For the sake of explanation, but not limitation, communications link 108 can be a network 108 using transmission control protocol ("TCP") and Internet Protocol ("IP"). However, it should be understood that clients 104 can be coupled to database servers 106 and database appliance 102 via other communications links. System 100 can further include a console system 110, an email server 114 and a service manager repository 115. Console system 110 can be a general purpose computer that can configure and retrieve information from database appliance 102.

According, to one embodiment of the present invention, database appliance 102 can run a service manager program 112 that is executable to provide alerts based on predefined thresholds, archive data and undertake control tasks to manage system 100. Configuration information can be provided to database appliance 102 for service manager program 112 by console system 110.

Each database client 104 can be configured with hardware and software to act as a database client that can communicate queries to database servers 106 using a query language such as SQL, T-SQL, XQUERY, SQL92, SQL99, SQL2003 or other query language. Each database server 106 is configured with hardware and software to act as a database server responsive to the queries in the query language. Database clients 104 and database servers 106 can support Distributed Relational Database Architecture ("DRDA") protocol. DRDA is an open architecture that enables communication between heterogeneous database clients and servers having different vendor platforms and hardware/software architectures. DRDA is compatible with a variety of different network protocols including, but not limited to TCP/IP and SNA. Database clients 104 and database servers 106 may also communicate using other architectures including, but not limited to, Tabular Data Stream ("TDS"), OracleNet or other database protocols. A particular database server 106 may provide access to databases according to different protocols (e.g., a database server 106 may give access to one database using DRDA and another using TDS).

A database client 104 can communicate messages toga database server 106 that include, for example, SQL queries. The receiving database server 106 can be responsive to the messages to make changes to a database and provide responses to the database client 104. Communications between a database client 104 and a database server 106 can, but need not, occur in acknowledged message exchange sequences.

Database appliance 102 can receive messages between database clients 104 and database servers 106, collect statistics on performance and provide other monitoring. According to one embodiment of the present invention, database appliance 102 can receive messages between a database client 104 and database server 106 in a passive mode or a proxy mode. In the first mode, a network switch of network 108 can be configured such that desired port traffic is mirrored to a port connected to database appliance 102. The process of configuring network switches and hubs to automatically route or mirror all network traffic at one port to another port is known in the art. In the proxy mode, messages to and from the database clients 104 and servers 106 are redirected through database appliance 102. In this case, the database client 102 believes the database appliance 102 is the database server and the database server 106 believes database appliance 102 is the database client 104. In proxy mode, database appliance 102 can cache query results from a database server and respond to subsequent queries from database clients 104 using cached data rather than forwarding the queries to the database server 106 as described below.

Regardless of the manner in which database appliance 102 is routed messages, database appliance 102 can collect a variety of database performance data including, but not limited to, number of queries for a particular database, average response time to queries to a particular database, size of a database, number of queries to a particular database server, average response time by that server, number of a particular query type (e.g., number of write queries), number of rows returned in response to a query; average response time for a query, number of queries issued by a database client, average response time to that client, number of queries for a database table, average response time for queries to a data base queries, number of queries answered by a database server, number of outstanding queries at a database server, average wait time at a database server and other statistics that represent some aspect of the performance of database system 100. In proxy mode, database appliance 102 can also gather statistics on the performance of caching at database appliance 102.

Database appliance 102, according to one embodiment of the present invention, can support network connectivity though an IP address. A user can then use an Internet browser or other suitable client software on a general purpose computer (e.g., console system 110) to access the IP address of database appliance 102. Database appliance can determine if console system 110 supports the Java™ runtime environment and if not can allow the user to download the Java™ runtime environment from database appliance 102 or request that the user download the Java™ runtime environment. The use of the Java™ runtime environment is provided by way of example and other processing environments, generally available or proprietary software or other mechanisms can be used for communications between console 110 and database appliance 102.

If console system 110 supports the JAVA™ runtime environment, database appliance 102 provides a JAVA™ panel to console system 110 for execution on console system 110. The JAVA™ panel in the JAVA™ runtime environment provides a console application that functions to authenticate the user, receive user requested information (e.g., performance data) from database appliance 102 and render the information to the user. One embodiment of providing visualization of performance data to a user is described in U.S. patent application Ser. No. 10/375,393 "System and Method for Tree Map Visualization for Database Performance Data," by Richard Walker and Jack Basiago, filed Feb. 27, 2003, which is hereby fully incorporated by reference herein. The console application need not be implemented as a JAVA™ panel but can be implemented according to other known programming languages and techniques and can provide a variety of functionality depending on implementation.

Through the console application, a user can configure service manager program 112 to retrieve information (e.g., performance data) from the memory (or other storage mechanism) of database appliance 102, archive the information in a flat-file, database or email. Additionally, service manager program 112 can be configured to compare performance data to a threshold and, if the threshold is met, notify the user via, for example, email. Service manager program 112 can also be accessed via a JAVA™ panel or using other known programming languages and techniques.

Figure 10:
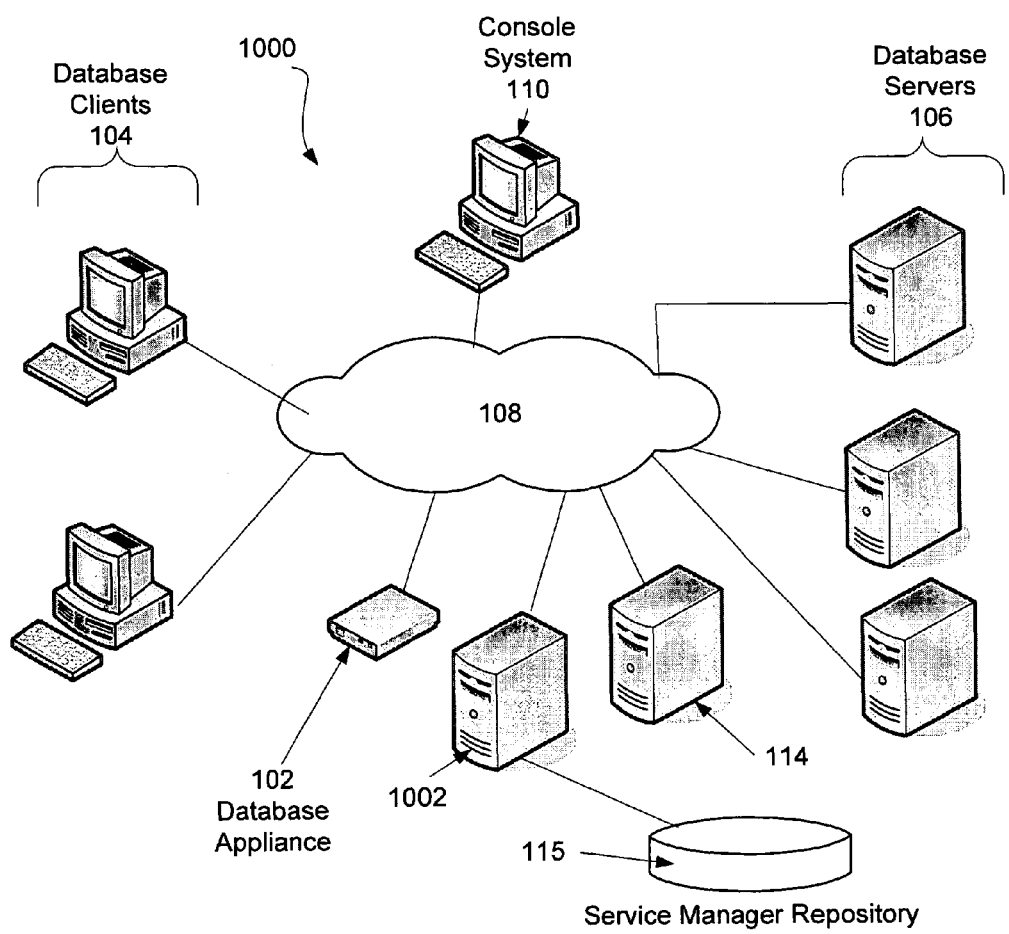
FIG. 10 is a diagrammatic representation of another embodiment of a system in which embodiments of a service manager can be implemented.

A user can configure service manager program 112 to access service manager repository 115 so that service manager program 112 can write data to service manager repository 115. FIG. 10 illustrates one embodiment of a screen provided by console system 110 for configuring service manager program 112. In this example, service manager repository 115 is a database, but in other examples, service manager repository 115 can be a file or other data structure stored on a computer readable storage medium such as a hard drive, optical disk, memory (RAM, ROM, flash memory or other memory). The user can also configure service manager program 112 to access email server 114 to send email alerts. FIG. 10 also provides an example of configuration information to allow service manager program 112 to access email server 114.

As an example, service manager program 112 can be configured to retrieve data from the memory of database appliance 102 every hour on the slowest queries at a particular database server and write the data to service manager repository 115. Additionally, service manager 112 can be configured to retrieve performance data every thirty minutes to determine if the response time for any queries is longer than a predefined threshold. If the response time for any of the queries is over the predefined threshold, service manager program 112 can generate an email using email server 114.

Service manager program 112 can also be configured to implement various database system control functions based on the application of rules to data retrieved from database appliance 102. For example, service manager program 112 can be configured with a rule that specifies that if a particular client attempts to write data to a database (when the client is only supposed to read data from the database), service manager program 112 can access the appropriate database server and change the client's privileges. Service manager program 112 can implement any suitable control functions to change the configuration of database clients, database servers, database appliance 102 or other systems.

Thus, service manager program 112 provides a mechanism to archive data in a database, file or email, alert users when user-configurable performance thresholds have been met and perform other management functions. Because the performance data is collected by database appliance 102, embodiments of the present invention can archive performance data and alert users when the performance data meets a threshold without requiring installation of agents or other software on the database clients 104 or database servers 106.

Although discussed as a program in FIG. 1, it should be noted that the service manager functionality can be implemented as software, hardware, firmware or a combination thereof. Moreover, the computer executable instructions can be a stand alone program, a module or function of another program or implemented according to any suitable programming language or architecture as would be understood by those in the art. Furthermore, although shown as a program running onboard database appliance 102, other embodiments of the present invention can include one or more external service manager programs in lieu of or in addition to the onboard service manager program 112 that can access database appliance 102.

Figure 2:
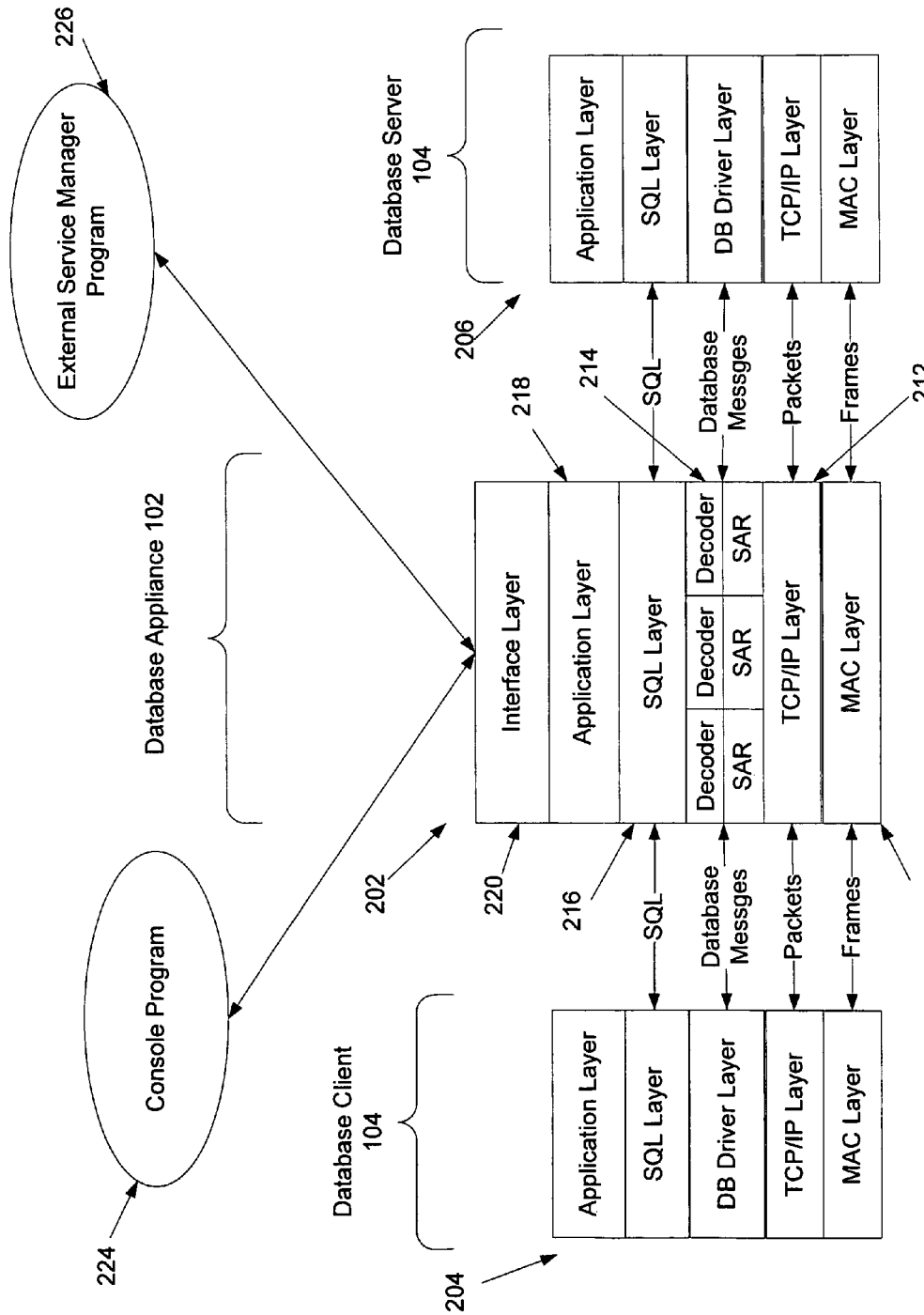
FIG. 2 is a diagrammatic representation of a protocol stack for a database appliance.

FIG. 2 illustrates an example protocol stack for communications at database appliance 102 on a TCP/IP network. Protocol stack 202 corresponds to database appliance 102, protocol stack 204 corresponds to a database client 104 and protocol stack 206 corresponds to a database server 106. Protocol stack 202 includes a media access control (MAC) layer 210, a TCP/IP layer 212, a database protocol engine 214, a SQL layer 216 and an application layer 218. Additionally, database appliance 102 can provide a management interface 220 to allow a console program (represented at 224) and external service manager programs (represented at 226) to access data stored by database appliance 102.

MAC layer 210 receives frames from MAC layers at database client 104 and database server 106, extracts packets from the frames and forwards the packets to TCP/IP layer 212. TCP/IP layer 212 receives packets from MAC layer 210 and extracts database messages from the packets. The database messages are sent to protocol engine 214, which then extracts SQL statements from the database messages. Database protocol engine 214 can be database protocol specific (e.g., be a DRDA protocol engine) or may support multiple database protocols. For each protocol supported, database protocol engine 214, can include a decoder that extracts SQL statements from particular database messages. For example, a first decoder may decode and extract SQL statements from DRDA messages, a second decoder may decode SQL statements from TDS messages and a third decoder may decode SQL statements from OracleNet messages. In particular embodiments, one or more decoders may include a segmentation and reassembly (SAR) engine to reassemble or segment database messages as described below.

SQL layer 216 receives SQL statements from protocol engine 214, normalizes and parses the SQL statements for use by application layer 218. Application layer 218 receives the SQL statements from SQL layer 216 and processes the SQL statements according to various applications residing at application layer 218. The applications can provide, by way of example, but not limitation, caching of queries and monitoring of communications between database client 104 and database server 106. One embodiment of a system for providing application layer functionality at a database appliance is described in U.S. patent application Ser. No. 10/933,790, entitled "Providing Application-Layer Functionality Between One or More Database Clients and One or More Database Servers," by Ewing et al., filed Sep. 3, 2004, which is hereby fully incorporated by reference herein.

Database appliance 102 can include hardware and software to cache responses to database queries at database appliance 102, record statistics with respect to caching and to return cached query responses to database clients in response to SQL statements rather than passing the SQL statements to the database server 106. This can increase the speed at which information is returned to database clients when database application 102 operates in its proxy mode. Moreover, database application 102 and allow cached database query responses to be updated, modified or deleted in response to SQL messages directed to the database from which the query response was cached. In other words, database appliance 102 can update/delete/modify one or more rows, fields or values cached at database appliance 102 in response to a SQL statement to update/delete/modify the corresponding row, field or value at the backend database. Embodiments of a system for providing query caching at a database appliance are described in U.S. patent application Ser. No. 10/933,786, entitled "Application-Layer Query Result Caching", filed Sep. 3, 2004, by Ewing et al. and U.S. patent application Ser. No. 10/441,714, entitled "System and Method for Query Result Caching", filed Nov. 25, 2004, by Ewing et al. each of which is fully incorporated by reference herein.

Database appliance 102 can monitor database messages between database client 104 and database server 106 and record observations including performance data regarding the database messages. One embodiment of a system for providing application-layer monitoring is described in U.S. patent application Ser. No. 10/934,887, entitled "Application-Layer Monitoring of Communications Between One or More Database Clients and One or More Database Servers" filed Sep. 3, 2004, to Ewing et al., which is hereby fully incorporated by reference herein. Database appliance 102 can further include an integrated service manager to archive stored information to a service monitor archive, compare information to predefined thresholds and if the threshold is met, send notifications to users and perform other management functions.

Management interface 220 allows console program 224 to access performance data or other information recorded or generated by database appliance 102. Based on this information, console program 224 can provide a visualization of performance data. Additionally, management interface 220 can allow an external service manager program 226 to access the performance data or other information if an external service manager is permitted access to database appliance 102. The external service manager program 226 can archive the performance data to a service manager repository and compare the performance data to user defined thresholds to generate alerts or notifications to inform a user of the status of the distributed database system being monitored. Management interface 220 can be a web server, network interface or other programmatic interface.

Figure 3:
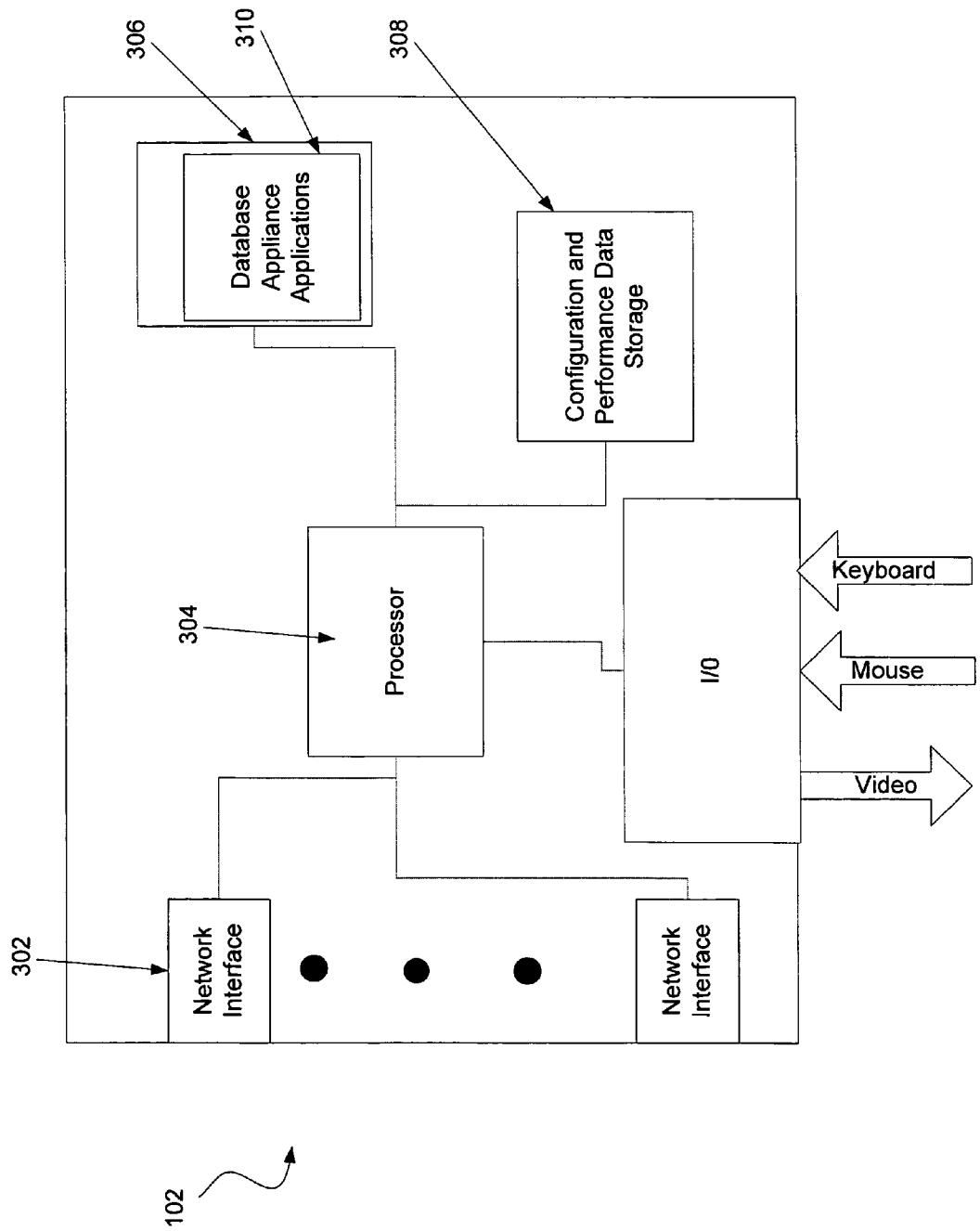
FIG. 3 is a diagrammatic representation of a database appliance.

FIG. 3 is a diagrammatic representation of one example of a database appliance 102. According to one embodiment of the present invention, database appliance 102 includes at least one network interface 302 to connect to and interface with a network, a processor 304 (e.g., a CPU, RISC, ASIC or other processor known in the art), a program memory 306 and a configuration and performance data storage memory 308. Program memory 306 and performance data storage memory 308 are computer readable media that can include, by way of example, RAM, ROM, magnetic disk, Flash memory or other memory known in the art. According to one embodiment, program memory 306 is a flash module and performance data storage memory 308 is RAM used to store performance data, network packets, program variables and other information. Database appliance 102 can further include inputs and outputs such as keyboard and mouse inputs, video and audio outputs or other inputs/outputs known in the art. Various components of database appliance 102 can be connected by one or more address and data buses. Program memory 306 can store an operating system and set of computer instructions 310 ("database appliance applications 310").

In one embodiment of the present invention, network interface 302 is an Ethernet controller. According to other implementations, network interface 302 can be a controller for Fibre. Channel, FDDI, SCSI, ATA, SATA, Serial SCSI, iSCSI, Infiniband or other controller. Moreover, database appliance 102 can include multiple network interfaces to connect to the same network through multiple ports, multiple networks using the same protocol (e.g., multiple Ethernet networks) or multiple networks using different protocols (e.g., to a Fibre Channel network and a SCSI bus).

Processor 304 provides for processing of an operating system (e.g., a Linux operating system) and database appliance applications 310 stored on program memory 306. Database appliance applications 310 can include instructions for query result caching, monitoring of database messages, providing an interface for a console program and a service manager program and other functionality. Database performance data collected or generated by a monitoring application can be stored in performance data storage 308. Database appliance applications can further include instructions for archiving data, generating user notifications based on data collected by database appliance 102 and undertaking other management tasks depending on implementation.

Database appliance applications 310 can further include the aforementioned JAVA™ panel that is downloaded and executed on the console computer. Database appliance applications 310 can allow the console program to connect to database appliance 102, specify user configuration data, request and receive specified database performance data to render a visualization of the database performance data. Database appliance applications can further provide an interface to allow an external service manager program to access performance data or other information on database appliance 102 for archiving, generating user notifications and other purposes depending on implementation. In this embodiment, database appliance applications 310 can provide a web server or other network server functionality to allow the console program and external service manager program to connect to and interact with database appliance 102.

The database appliance applications 310 can be implemented as multiple programs, a single program or according to any suitable programming architecture and language(s) known in the art. Moreover, the embodiment of FIG. 3 is provided by way of example, and database appliance 102 can comprise other components and can have a variety of form factors. In one embodiment, database appliance 102 is rack mounted server and has a height of approximately one height unit.

Figure 4:
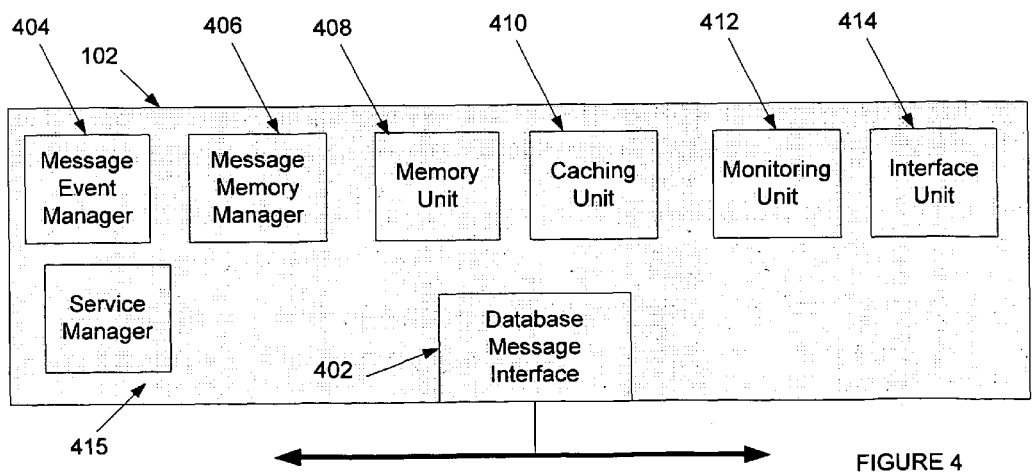
FIG. 4 is a diagrammatic representation of the functionality of one embodiment of a database appliance.

FIG. 4 is a diagrammatic representation of one embodiment of database appliance 102 from a functional perspective. Database appliance 102 includes database message interface 402, a message event manager 404, a message memory manager 406, a memory unit 408, a caching unit 410, a monitoring unit 412, client interface unit 414 and a service manger 415. Various functional components of database manager 102 can be physically or logically separate from each other or share hardware, software or embedded logic. It should be noted that the various functional components of FIG. 4 can utilize the hardware, software or both depicted in FIG. 3.

Database message interface 402 includes one or more of hardware, software, embedded logic to provide an interface between database appliance 102 and a network (e.g., network 108 of FIG. 1) or other communications link. Database message interface 402 can be, for example, an interprocess communication ("IPC") interface. Database message interface 402 can be a passive interface that enables database appliance 102 to monitor database messages between one or more database clients and one or more database servers. In this embodiment, a mirrored port can direct database messages to database appliance 102. In another embodiment, database message interface 402 is a proxy for one or more database servers.

When database message interface 402 receives a database message, database message interface 402 notifies message event manager 404 of the received database message. Message event manager 404 then invokes message memory manager 406 to write the database message to memory unit 408, which may include volatile memory, nonvolatile memory or both and can be a portion of or include performance data storage memory 308 of FIG. 3. In particular embodiments, to communicate a database Message from memory unit 408 to a database client or database server, database message interface 402 can use direct memory access ("DMA") to access memory unit 408. Database appliance 102 need not generate or reassemble the frames to communicate the database message to the database client or server. This can reduce clock-cycle requirements and other resource utilization.

Message event manager 404 can include one or more of hardware, software or embedded logic to process message events at database appliance 102. Processing can occur across multiple protocol layers shown in FIG. 2. According to one embodiment, message event manager 404 processes events associated with a database message ("message events") from a message event queue (e.g., a FIFO queue or other queue). Example message events include, but are not limited to receiving a database message, data becoming available for processing, data becoming ready for communication, database appliance 102 establishing a connection to a database client or server, database appliance 102 dropping a connection with a database client or server or other message event.

When a message event occurs at database appliance, database appliance 102 adds the message event to the event queue for processing. For example, if database message interface 402 receives a dataset message from a database client or database server, database message interface 402 can add an event to the message event queue. Message event manager 404 can then pull the message event from the queue and prompt message memory manager 406 to write the database message to memory unit 408. Message event manager 404, according to one embodiment of the present invention, uses a single nonblocking, event driven control thread that processes events at database appliance 102. If the event queue includes one or more message events, the control thread accesses a message event at front of the event queue and starts to process the message event. If the event queue does not include a message event, the control thread waits until the event queue receives a message event to process, at which point the control thread accesses and starts to process the message event.

If the control thread finishes processing a first message event, the control thread accesses the event queue to pull a second message event from the event queue for processing. If, while processing a first message event, the control thread reaches a point at which the control thread requires currently unavailable data from one or more components of database appliance 102 to continue processing the message event, the control thread instructs one or more of the components to notify message event manager 404 when the required data becomes available. The control thread then accesses the event queue to pull a second message event from the event queue for processing. When the required data becomes available, the one or more components instructed to notify message event manager 404 to add an entry to the event queue indicating that the required data is available. When the control thread accesses the event queue and the entry indicating that the required data is available is at a front of the event queue, the control thread resumes processing the first message event. If, while processing a first message event, the control thread reaches a point at which the control thread requires one or more components of database appliance 102 to execute one or more tasks to continue processing the message event, the control thread instructs one or more of the components to notify message event manager 404 when the required tasks are complete. The control thread then accesses the event queue to pull a second message event from the event queue for processing. When the required tasks are complete, the components are instructed to notify message event manager 404 to add an entry to the event queue indicating that the required tasks are complete. When the control thread accesses the event queue and the entry indicating that the required tasks are complete is at a front of the event queue, the control thread resumes processing the first message event.

In particular embodiments, to process a message event, the control thread communicates a call to a component (such as, for example, database message interface 402, message memory manager 406, caching unit 410, or monitoring unit 412) of database appliance 102 to invoke the component. In particular embodiments, to process a new connection established between database appliance 102 and a client 104 or a database server 106, the control thread instantiates a session object (such as, for example, a C++ object or a JAVA object) for the new connection. In particular embodiments, to process a database message received at database appliance 102 from a client 104 or a database server 106, the control thread similarly instantiates a session object for the database message. The control thread may concurrently manage multiple session objects. Message event manager 404 uses network interfaces that invoke callback methods on session objects, Instead of network interfaces that block or otherwise wait for completion of network or other operations. In particular embodiments, network events such as data available, ready to send, new connection, and connection closed propagate through relevant session objects for database protocol processing.

In contrast to particular embodiments, traditional database-protocol processing requires a control thread directing communication of one or more frames to hold, before resuming processing, until transmission and receipt of the frames are complete. Because of such requirement, processing multiple, concurrent database sessions according to a traditional database protocol requires use of multiple, concurrent control threads, which in turn requires mechanisms (such as, for example, semaphores or locks) for protecting shared data structures from corruption resulting from unsynchronized access. Putting into place and releasing such mechanisms to protect and access such data structures as needed increases clock-cycle and memory requirements and other resource utilization associated with processing multiple, concurrent database sessions. In particular embodiments, using a single nonblocking, event-driven control thread to process message events at database appliance 102 obviates such mechanisms for processing multiple, concurrent database sessions, which in turn reduces clock-cycle and memory requirements and other resource utilization associated with processing multiple, concurrent database sessions.

Message memory manager 406 includes hardware, software, or embedded logic component or a combination of two or more such components that allocate memory in memory unit 408 for storing database messages and manage access to database messages in memory unit 408. In particular embodiments, when database message interface 402 receives a database message from a client 104 or a database 30 server 106, database message interface 402 notifies message event manager 404 that database message interface 402 received the database message. Message event manager 404 then invokes message memory manager 406 to write the database message to memory unit 408. One or more frames (such as, for example, Ethernet frames) may include the database message. In particular embodiments, message memory manager 406 writes the frames of the database message to memory unit 408 without assembling the database message. As an example and not by way of limitation, when database message interface 402 receives a frame from a database client 104 or a database server 106, message memory manager 406 may write the frame to memory unit 408 without modifying the frame. Message memory manager 406 may write different portions of the frame to different, separately addressed memory locations in memory unit 408, which need not be contiguous with each other. In particular embodiments, message memory manager 406 also generates a buffer (an abstract data structure) including one or more pointers to one or more memory locations in memory unit 408 to which message memory manager 406 wrote the frame. To process contents of the frame, a first component of database appliance 102 may communicate the buffer-instead of the frame itself to one or more second components of appliance 102. The first component need not reassemble the frame or copy the frame from one or more first, original memory locations of the frame in memory unit 408 to one or more second memory locations in memory unit 408 or elsewhere. When the first component communicates the buffer to the second components, the second components may then, using message memory manager 406, access the frame in memory unit 408 according to the buffer to process contents of the frame. Such "zero copy" processing may reduce clock-cycle requirements and other resource utilization associated with processing the frame.

Caching unit 410 includes hardware, software, or embedded logic component or a combination of two or more such components that cache query results from database servers 106 and use cached query results to respond to queries from clients 104, as described below. Monitoring unit 412 includes hardware, software, or embedded logic component or a combination of two or more such components that collect and record statistics on communication between clients 104 and database servers 106, caching activity at database appliance 102, or both, as described below.

Client interface unit 414 includes hardware, software or embedded logic or a combination of two or more such components to provide an interface for a console program and a service manager program to access performance data stored in memory unit 408. Client interface unit 414 can provide a web server or other network server to allow other, programs to connect to and interact with database appliance 102.

Service manager 415 includes hardware, software (e.g., service manager program 112 of FIG. 1), or embedded logic component or a combination of two or more such components. Service manager 415 can provide an interface to a console program or other program via a network to receive configurations and job descriptions. Based on the job descriptions, service manager 415 can access database performance data and other information in memory unit 408, archive the performance data to a service manager repository (internal or external) and provide notifications to users. According to one embodiment, service manger 415, communicates with other components of database appliance 102 on the circuit board level or through other suitable mechanism by which software modules running on the same computer can communicate rather than over a network connection.

Service manager 415 can provide a programmatic interface with a console program. As discussed above, this can be implemented through a JAVA™ panel interface using the JAVA™ runtime environment. Through the console program, a user can provide service manager configuration data to service manager 415. The configuration information can include, by way of example, but not limitation, information to connect to other database appliances, a service manager repository (e.g., a database such as service manager repository 115 of FIG. 1) and an email server (e.g., email server 114 of FIG. 1). Additionally, a user can provide job descriptions to service manager 415. Each job description can specify a job that includes information to be collected from database appliance 102, an action to be taken with the collected data and a schedule for performing the job. A job description can also include user defined thresholds against which service manager 415 can compare items of data (e.g., a performance statistic) collected from database appliance 102 in determining whether to take a specific action. In yet another embodiment, the job description can specify rules to apply to data retrieved from database appliance 102 and actions to be taken if the rules are satisfied to manage various aspects of the database system being monitored. The action can include, for example, logging into database servers to change user and database client profiles, add, delete or update information stored in a database, logging into database clients (e.g., application servers) to change the configuration of the client, logging into other computer systems (e.g., web servers) to notify the computer system of an event or other action.

Service manager 415 stores configuration information and job descriptions in one or more files, records or other suitable data structures. For example, service manager 415 can store configuration data in a file in nonvolatile memory that is loaded each time service manager program 910 is executed. Thus, service manager program 112 is automatically executed at startup or reboot (e.g., as part of a .bat file), database appliance 102 connects to the appropriate other database appliance(s), database(s) and email server(s) specified in the file without reconfiguration after power cycling, reboot or other event that clears volatile memory. Job descriptions can also be saved in non-volatile memory so that they are maintained across such events. The set of job descriptions and configuration information maintained by service manager 415 can be updated as the user changes the job descriptions and configuration information.

Service manager 415, according to one embodiment of the present invention, queues the jobs provided by the job descriptions. The jobs can be queued in an event driven queue that contains events corresponding to various phases of each job or according to other queuing mechanisms known in the art. When it is time to perform a particular job, service manager program 415 retrieves the performance data or other information specified in the job description. When service manager 415 retrieves the information from the database appliance memory, service manager 415 then performs the defined task. This can include, for example, archiving the information to a comma-separated value ("CSV") file, a database or other data storage structure, comparing a collected piece of data to a predefined threshold and, if the threshold is met, providing a notification to a user, or performing a control function based on the application of rules to the data collected from the database appliance.

As one example, a user can provide a job description that specifies that service manager 415 should review the collected "slowest query" data every hour and send a notification to a particular email address if there is a query for which the response time exceeded a particular threshold. Every hour, service manager 112 can retrieve the slowest query data from the database appliance memory (e.g., from memory module 408) and compare the response time to the predefined threshold. For each query in the hour period for which it took longer than the threshold time to respond, service manager 415 can send a notification to a user (e.g., as a single notification or a separate notification for each query for which the response time took over the threshold). Notification can take the form, for example, of an email, an SNMP trap, a web based communication or other notification.

It should be noted that the embodiment of service manager 415 described in conjunction FIG. 4 is provided by way of example and service manager 415 can be collocated with the console system, located at an external database appliance or other service manager system. Additionally, service manager 415 can provide its own user interface such that users connected to service manager program 415 without the use of a separate console program or web browser. Service manager 415 can be an "always on" system for providing archiving and notification. Consequently, performance data can be continually collected and archived, and users (e.g., systems administrators) provided with notifications even if console system 110 is not being monitored.

Figure 5:
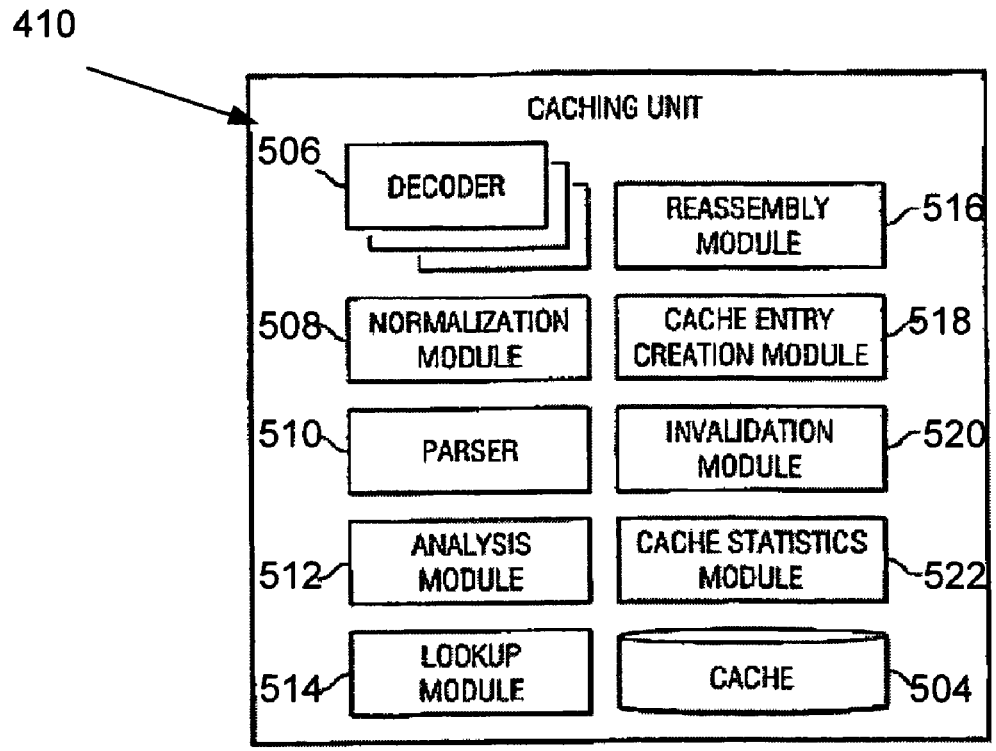
FIG. 5 is a diagrammatic representation of a caching unit.

FIG. 5 illustrates an example caching unit 410 of database appliance 102. Caching unit 410 includes a cache 504, multiple decoders 506, a normalization module 508, a parser 510, an analysis module 512, a lookup module 514, a reassembly module 516, a cache entry creation module 518, an invalidation module 520, and a cache statistics module 522. In particular embodiments, two or more components of caching unit 410 are logically separate from each other. In particular embodiments, two or more components of caching unit 410 share a hardware, software, or embedded logic component or a combination of two or more such components with each other. Caching unit 410 can provide processing across multiple layers of the protocol stack of FIG. 2. Cache 504 includes records of query results. Cache 504 may be volatile or nonvolatile. In particular embodiments, a record (or cache entry) in cache 504 includes a discriminator that uniquely identifies the record. The record also includes one or more buffers pointing to one or more memory locations in memory unit 408 that include one or more frames of one or more database messages including one or more query results responsive to a query. The record need not include the frames of the database messages or the query results themselves, and cache entry creation module 518 need not assemble or format the query results to create the record. In particular embodiments, the record also identifies a database instance and a table from which each of the query results originated. In particular embodiments, the record also indicates a date and time when the record was created and dates and times when the record was accessed. In particular embodiments, the record also identifies users who have accessed the record and indicates, for each of the users, a number of times the user has accessed the record and dates and times when the user accessed the record. In particular embodiments, cache 504 includes a map of records in cache 504 for fast lookup of such records. The map may include a red/black search tree or other search tree including discriminators identifying records in cache 504. Lookup module 514 may use the map to look up cache entries, as described below.

A decoder 506 includes a hardware, software, or embedded logic component or a combination of two or more such components that decode and extract SQL statements from database messages. In particular embodiments, a decoder 506 resides on top of a TCP/IP layer of a protocol stack, as described below. Decoders 506 each decode and extract SQL statements from particular database messages. As an example and not by way of limitation, caching unit 410 may include a first decoder 506, a second decoder 506, and a third decoder 506. First decoder 506 may decode and extract SQL statements from DRDA database messages, second decoder 506 may decode and extract SQL statements from TDS database messages, and third decoder 506 may decode and extract SQL statements from OracleNet database messages. Although particular decoders 506 decoding and extracting SQL statements from particular database messages are described, the present invention contemplates any suitable decoders 506 decoding and extracting SQL statements from any suitable database messages.

Decoders 506 are event driven and each include an interface (or function point) enabling message event manager 404 to invoke decoder 506. As an example and not by way of limitation, in response to database message interface 402 receiving a database message from a client 104 or a database server 106, message event manager 404 may communicate a call to decoder 506 invoking decoder 506 to decode and extract an SQL statement from the database message. The call may include a buffer pointing to the database message in memory unit 408. The call need not include the database message itself. Decoder 506 may access the database message according to the buffer and then decode the database message, extract an SQL statement from the database message, and communicate the SQL statement to normalization module 508 for normalization. In particular embodiments, decoders 506 include interfaces similar to each other, which may obviate message event manager 404 having multiple interfaces for invoking decoders 506. In such embodiments, message event manager 404 may use a single interface to invoke any one of decoders 506.

In particular embodiments, when database message interface 402 receives a database message, message event manager 406 selects a decoder 506 to decode the database message according to a port on which database message interface 402 received the database message. As an example and not by way of limitation, database appliance 102 may include a first port configured (manually or otherwise) to receive database messages intended for a DRDA database server 106, a second port configured to receive database messages intended for a TDS database server 106, and a third port configured to receive database messages intended for an OracleNet database server 106. When database message interface 402 receives a database message on the first port, message event manager 406 may invoke a DRDA decoder 506 to decode and extract an SQL statement from the database message. When database message interface 402 receives a database message on the second port, message event manager 406 may invoke a TDS decoder 506 to decode and extract an SQL statement from the database message. When database message interface 402 receives a database message on the third port, message event manager 406 may invoke an OracleNet decoder 506 to decode and extract an SQL statement from the database message.

In particular embodiments, when database message interface 402 receives a database message, message event manager 406 selects a decoder 506 to decode the database message according to contents of the database message. As an example and not by way of limitation, database message interface 402 may receive a database message from a client 104 or a database server 106. Message event manager 404 may read contents of the database message to determine whether the database message is a DRDA database message, a TDS database message, or an OracleNet database message. If message event manager 404 determines that the database message is a DRDA database message, message event manager 406 may invoke a DRDA decoder 506 to decode and extract an SQL statement from the database message. If message event manager 404 determines that the database message is a TDS database message, message event manager 406 may invoke a TDS decoder 506 to decode and extract an SQL statement from the database message. If message event manager 404 determines that the database message is an OracleNet database message, message-event manager 406 may invoke an OracleNet decoder 506 to decode and extract an SQL statement from the database message.

Normalization module 508 includes a hardware, software, or embedded logic component or a combination of two or more such components that normalize SQL statements. Normalization of two SQL statements facilitates determination of equivalency between the two SQL statements. As an example and not by way of limitation, a decoder 506 may extract an SQL statement from a query and communicate the SQL statement to normalization module 508. Normalization module 508 may then normalize the SQL statement. Lookup module 514 may compare the normalized SQL statement with normalized query text identifying records in cache 504 and, if the normalized SQL statement is equivalent to normalized query text identifying a cache entry, determine that the cache entry includes one or more query results responsive to the query.

In particular embodiments, to normalize an SQL statement, normalization module 508 capitalizes all letters in the SQL statement. In particular embodiments, to normalize an SQL statement, normalization module 508 reorders, terms in the SQL according to a predetermined order. In particular embodiments, to normalize an SQL statement, normalization module 508 modifies one or more clauses in the SQL statement according to a predetermined clause equivalency. Although particular normalization of SQL statements is described, the present invention contemplates any suitable normalization of SQL statements.

Parser 510 includes a hardware, software, or embedded logic, component or a combination of two or more such components that parse SQL statements. As an example and not by way of limitation, normalization module 508 may normalize an SQL statement and communicate the SQL statement to parser 510. Parser 510 may parse the SQL statement. In particular embodiments, to parse an SQL statement, parser 510 includes a left-to-right and rightmost derivation (LR) parser. In such embodiments, to parse an SQL statement, parser 510 may use predetermined state tables derived from a specified SQL grammar. Multiple state tables may be available to parser 510, and each of the state tables may support a particular dialect of SQL. Parser 510 may select a state table for parsing an SQL statement according to a database implementation (such as DRDA, TDS, or OracleNet) of an intended database instance. Although particular parsing of particular SQL statements is described, the present invention contemplates any suitable parsing of any suitable SQL statements.

Analysis module 512 includes a hardware, software, or embedded logic component or a combination of two or more such components that analyze SQL statements. Caching unit 410 may process an SQL statement according to one or more results of analysis of the SQL statement at analysis module 512. In particular embodiments, analysis module 512 analyzes an SQL statement to determine whether the SQL statement includes a query, a query result, or a write message. In particular embodiments, analysis module 512 analyzes an SQL statement to identify a database server 106, a database instance, a table in the database instance, a client 104, a user, or a combination of two or more of the preceding. As an example and not by way of limitation, parser 510 may communicate a parsed, normalized SQL statement including a query to analysis module 512. Analysis module 512 may analyze the SQL statement and, from the analysis, determine that the SQL statement includes a query. From the analysis, analysis module 512 may also identify an intended database server 106, an intended database instance, and an intended table in the database instance. From the analysis, analysis module 512 may also identify a user who generated and a client 104 that communicated the query. Because the SQL statement includes a query, analysis module 512 may communicate the SQL statement (and possibly one or more results of the analysis of the SQL statement) to lookup module 514 for lookup. If an administrator of database appliance 102 has disabled (or not enabled) database appliance 102 responding to queries according to cached query results with respect to intended database server 106, the intended database instance, the intended table in the database instance, the user who generated the query, or client 104 that communicated the query, analysis module 512 may withhold the SQL statement from Lookup module 514 so that database appliance 102 does not communicate a response to client 104 according to one or more cached query results.

As another example, parser 510 may communicate a parsed, normalized SQL statement including a query result to analysis module 512. Analysis module 512 may analyze the SQL statement and, from the analysis, determine that the SQL statement includes a query result. From the analysis, analysis module 512 may also identify an intended user and an intended client 104. From the analysis, analysis module 512 may also identify a database server 106 that communicated the query result and a database instance and a table in the database instance that included the query result. In particular embodiments, because the SQL statement includes a query result, analysis module 512 communicates to reassembly module 516 a buffer pointing to a database message in memory unit 408 including the query result. Reassembly module 516 may then cause database message interface 402 to communicate the database message including the query result from memory unit 408 to a client 104. In particular embodiments, because the SQL statement includes a query result, analysis module 512 communicates the SQL statement (and possibly one or more results of the analysis of the SQL statement) to cache entry creation module 518 for creation of a cache entry. If an administrator of database appliance 102 has disabled (or not enabled) database appliance 102 caching query results with respect to database server 106 that communicated the query result, the database instance that included the query result, the table in the database instance that included the query result, intended client 104, or the intended user, analysis module 512 may withhold the SQL statement from cache entry creation module 518 so that database appliance 102 does not cache the query result.

As yet another example, parser 510 may communicate a parsed, normalized SQL statement including, a write message to analysis module 512. Analysis module 512 may analyze the SQL statement and, from the analysis, determine that the SQL statement includes a write message. From the analysis, analysis module 512 may also identify an intended database server 106, an intended database, and an intended table in the database instance. From the analysis, analysis module 512 may also identify a user who generated and a client 104 that communicated the write message. Because the SQL statement includes a write message, analysis module may communicate the SQL statement (and possibly one or more results of the analysis of the SQL statement) to invalidation module 520 for invalidation of one or more cache entries. Lookup module 514 includes a hardware, software, or embedded logic component or a combination of two or more such components that lookup cached query results. As an example and not by way of limitation, analysis module 512 may communicate a normalized, parsed SQL statement including a query to lookup module 514. Lookup module 514 may then use the normalized, parsed SQL statement to determine whether a record in cache 504 includes one or more query results responsive to the query. If a record includes one or more query results responsive to, the query, lookup module 514 may communicate to reassembly module 516 a buffer pointing to one or more database messages in memory unit 408 that, according to the cache entry, include one or more query results responsive to the query. Reassembly module 516 may then cause database message interface 402 to communicate the database message from memory unit 408 to a client 104. If a record does not include a valid response to the query, lookup module 514 may communicate the query to cache entry creation module 518 for creation of a cache entry. Lookup module 514 may also communicate to reassembly module 516 a buffer pointing to a database message including the query. Reassembly module 516 may then cause database message interface 402 to communicate the database message memory unit 408 to a database server 106. To look up cached query results, lookup module 514 may access a mapping (which may include a red/black search tree or other tree data structure facilitating lookup) of discriminators identifying records in cache 504 and compare the discriminators with normalized, parsed SQL statements including queries.

In particular embodiments, if lookup module 514 receives a normalized, parsed SQL statement including a query and cache 504 does not include a record fully responsive to the query, but includes a record partially responsive to the query, lookup module 514 may communicate to reassembly module 516 a buffer pointing to one or more database messages in memory unit 408 that, according to the cache entry, include one or more query results partially responsive to the query. As an example and not by way of limitation, the query may request all data from all fields in rows one through 1000 in a table and the record in cache 504 may include query results including only data from fields in rows one through 100 in the table. In response to the buffer from lookup module 514, reassembly module 516 may cause database message interface 402 to communicate the database messages including the partially responsive query results from memory unit 408 to a client 104. Lookup module 514, may also communicate to reassembly module 516 a buffer pointing to a database message including the query. Reassembly module 516 may then cause database message interface 402 to communicate the database message including the query from memory unit 408 to a database server 106.

Caching unit 410 may subsequently receive one or more database messages communicated from database server 106 including one or more query results responsive to the query. As an example and not by way of limitation, caching unit 410 may subsequently receive database messages communicated from database server 106 including query results including all data from all fields in rows one through 1000 in the table, instead of just data from fields in rows one through 100 in the table. In response to caching unit 410 receiving database messages communicated from database server 106 including query results responsive to the query, caching unit 410 may cause database message interface 402 to communicate from memory unit 408 database messages communicated from database server 106 that include query results responsive to the query and not previously communicated from cache 504 to client 104. Caching unit 410 may also cause memory unit 408 to discard any database messages communicated from database server 106 that include query results responsive to the query, and previously communicated from cache 504 to client 104. Caching unit 410 may also add one or more of the query results in the database messages communicated from database server 106 to the record partially responsive to the query.

Reassembly module 516 includes a hardware, software, or embedded logic component or a combination of two or more such components that direct communication of cached query results from database appliance 102 to clients 104 and direct communication of queries received at database appliance 102 to database servers 106. As an example and not by way of limitation, lookup module 514 may communicate to reassembly module 516 a buffer pointing to one or more database messages in memory unit 408 including one or more query results responsive to a query received at database appliance 102 from a client 104. Reassembly module 516 may direct database message interface 402 to access the database messages according to the buffer, and database message interface 402 may then access the database messages using DMA and communicate the database messages to client 104. Neither reassembly module 516 nor database message interface 402 need compound or format the database messages to communicate the database messages to client 104. As another example, lookup module 514 may communicate to reassembly module 516 a buffer pointing to a database message in memory unit 408 including a query to which no cache entries are responsive. Reassembly module 516 may direct database message interface 402 to access the database message according to the buffer, and database message interface 402 may then access the database message using DMA and communicate the database message to a database server 106. Neither reassembly module 516 nor database message interface 402 need compound or format the database message to communicate the database messages to database server 106.

Cache entry creation, module 518 includes a hardware, software, or embedded logic component or a combination of two or more such components that create and maintain records of query results in cache 504. As described above, a record in cache 504 includes a discriminator that uniquely identifies the record and one or more buffers pointing to one or more memory locations in memory unit 408 that include one or more frames of one or more database messages including one or more query results responsive to a query. In particular embodiments, to create a record in cache 504, cache entry module 518 allocates memory in cache 504 for the record, generates a discriminator for the record, writes the discriminator and one or more buffers to the record, and adds a timestamp to the record indicating when cache entry creation module 518 created the record. As an example and not by way of limitation, lookup module 514 may communicate to cache entry creation module 518 a parsed, normalized SQL statement including a query. Cache entry creation module 518 may then allocate memory for a record of query results responsive to the query. Cache entry, creation module 518 may then generate a discriminator uniquely identifying the record.

In particular embodiments, the discriminator includes normalized text from the query, identifies a user who generated the query, and indicates one or more environmental variable settings influencing one or more query results in the record. Cache creation module 514 may hash the discriminator to facilitate host lookup of the cache entry. Cache entry creation module 518 may then add the discriminator to a mapping (such as, for example, a red black search tree or other search tree) facilitating fast lookup of the cache entry. Cache entry creation module 518 may also add a timestamp to the record indicating when cache entry creation module 518 created the record. Later, analysis module 40 may communicate to cache entry creation module 518 a buffer pointing to a database message in memory unit 408 including a query result responsive to the query and one or more results (such as an intended user, an intended client 104, a database server 106 that communicated the query result, and a database instance and a table in the database instance from which the query result originated) of an analysis of a parsed, normalized SQL statement including the query result. Cache entry creation module 518 may then write the buffer and the results of the analysis of the SQL statement to the record.

In particular embodiments, to maintain the record in cache 504, cache entry creation module 518 adds to the record additional buffers pointing to additional database messages responsive to the query and records users who access the record, when each of the users accesses the record, and a number of times each user accesses the record.

Invalidation module 520 includes a hardware, software, or embedded logic component or a combination of two or more such components that invalidate entries in cache 504, delete entries in cache 504 to free up memory in cache 504, or both, according to particular needs. In particular embodiments, invalidation module 520 invalidates cache entries based on write messages. As an example and not by way of limitation, invalidation module 520 may receive from analysis module 512 a normalized, parsed SQL-statement including a write message intended for a table in a database instance. Invalidation module 520 may also receive from analysis module 512 identification of the table in the database instance. Invalidation module 520 may then access cache 504 and identifies records in cache 504 including query results that originated from the table in the database instance. Invalidation module 520 may invalidate such records. In particular embodiments, to invalidate a cache entry, invalidation module 520 deletes the cache entry. In particular embodiments, to invalidate a cache entry, invalidation module 520 marks the cache entry to indicate that the cache entry is invalid, but does not delete the cache entry. In particular embodiments, invalidation module 520 invalidates cache entries based on aging.

As an example and not by way of limitation, if a predetermined amount of time has lapsed since creation of a cache entry, invalidation module 520 may invalidate the cache entry based on the age of the cache entry. In particular embodiments, invalidation module 520 periodically or in response to input from an administrator of database appliance 102 scans cache 504 to identify entries in cache 504 for such invalidation. In particular embodiments, invalidation module 520 invalidates cache entries based on scheduling. As another example and not by way of limitation, invalidation module 520 may invalidate all or some entries in cache 504 according to a predetermined schedule (such as, for example, every day at a particular time or once a week on a particular day at a particular time). In particular embodiments, invalidation module 520 invalidates cache entries based on external triggers. As an example and not by way of limitation, invalidation module 520 may invalidate all or some entries in cache 504 in response to one or more external triggers (such as, for example, input from an administrator or occurrence of a predetermined event). Although particular invalidation of particular cache entries is described, the present invention contemplates any suitable invalidation of any suitable cache, entries.

In particular embodiments, invalidation module 520 deletes cache entries in response to utilization of memory in cache 504 reaching a predetermined threshold, in response to utilization of memory in cache 504 preventing creation of new entries in cache 504, or both. In particular embodiments, if utilization of memory in cache 504 reaches a predetermined limit or prevents creation of a new entry in cache 504 invalidation module 520 selects one or more entries in cache 504 for deletion based on recent usage of entries in cache 504. As an example and not by way of limitation, invalidation module 520 may select one or more least recently used entries in cache 504 for deletion. In particular embodiments, if utilization of memory in cache 504 reaches a predetermined limit or prevents creation of a new entry in cache 504, invalidation module 520 selects one or more entries in cache 504 for deletion according to one or more cost-based algorithms taking into account observed network client response time and other network-derived factors. Although deletion of particular entries in cache 504 is described, the present invention contemplates deletion of any suitable entries in cache 504.

Cache statistics module 522 includes a hardware, software, or embedded logic component or a combination of two or more such components that collect statistics on caching activity at caching unit 410. In particular embodiments, cache statistics module 522 collects statistics on cache hits at database appliance 102. A cache hit is a cache entry being responsive to a query received at database appliance 102 from a client 104, which may or may not result in communication of a query result from cache to client 104, as described above. As an example and not by way of limitation, cache statistics module 522 may track and record (1) a number of queries from a client 104 intended for a database server 106 and (2) a number of cache hits on the queries. Cache statistics module 522 may compare the two numbers with each other and, from the comparison, determine a percentage of cache hits on queries from client 104 intended for database server 106. Cache statistics module 522 may determine a percentage of cache hits on queries from each of multiple clients 104 intended for each of multiple database servers 106. Cache statistics module 522 may combine two or more such percentages to provide more comprehensive statistics on cache hits at database appliance 102. From historical statistics on cache hits at database appliance 102, cache statistics module 522 may generate a historical cache-hit rate for database appliance 102.

In particular embodiments, cache statistics module 522 collects statistics on cache entries. As an example and not by way of limitation, cache statistics module 522 may track and record a number of records in cache 504. As another example, cache statistics module 522 may track and record a result-set size in each of one or more records in cache 504. As yet another example, cache statistics module 522 may track and record one or more cost factors based on response time. As yet another example, cache statistics module 522 may, using timestamps, track and record a date and time of creation of each of one or more records in cache 504 and dates and times of access of each of the entries. In particular embodiments, cache statistics module 522 collects statistics on invalidation of entries in cache 504. As an example and not by way of limitation, cache statistics module 522 may track and record invalidated entries and, using timestamps, times and dates of invalidation of invalidated entries. Although particular statistics on caching activity at caching unit 410 are described, the present invention contemplates any suitable statistics on caching activity at caching unit 410. In particular embodiments, cache statistics module 522 communicates collected cache statistics to monitoring unit 412 for storage.

Figure 6:
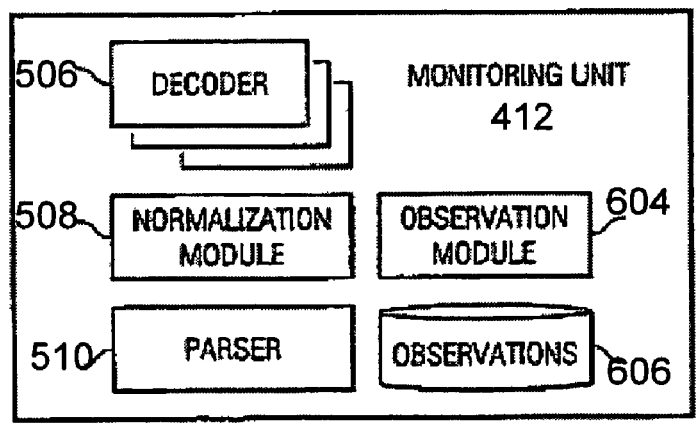
FIG. 6 is a diagrammatic representation of one embodiment of a monitoring unit.

FIG. 6 illustrates an example monitoring unit 412 of database appliance 102. Monitoring unit 412 includes multiple decoders 506, a normalization module 508, a parser 510, and an observation module 604. In particular embodiments, two or more components of monitoring unit 412 are logically separate from each other. In particular embodiments, two or more components of monitoring unit 412 share a hardware, software, or embedded logic component or a combination of two or more such components with each other. In particular embodiments, decoders 506 in monitoring unit 412 are similar to decoders 506 in caching unit 410 described above. In particular embodiments, normalization module 508 in monitoring unit 412 is similar to normalization module 508 in caching unit 410 described above. In particular embodiments, parser 510 in monitoring unit 412 is similar to parser 510 in caching unit 410 described above.

Observation module 604 includes hardware, software, or embedded logic component or a combination of two or more such components that record observations 606 on contents of database messages between clients 104 and database servers 106. As an example and not by way of limitation, observation module 604 may receive from parser 510 parsed, normalized SQL statements extracted from decoded database messages, access contents of the SQL statements, and record observations 606 on the contents of the SQL statements. As another example, observation module 604 may receive the decoded database messages themselves, access contents of the database messages outside the SQL statements, and record observations 606 on the contents of the database messages. Observations 606 can further include statistics and other database performance data collected based on the database messages. Monitoring unit 412 may provide user access to observations 606 through a statistical, historical, tabular, graphical, or other interface or a combination of two or more such interfaces.

In particular embodiments, monitoring unit 412 communicates observations 606 to one or more computer systems (such as a console system or service manager system) that report observations 606 to users, according to particular needs. In particular embodiments, monitoring unit 412 communicates observations 606 to one or more computer systems that take action in response to observations 606, according to particular needs. As an example and not by way of limitation, monitoring unit 412 may communicate observations 606 to a computer system maintaining a web cache. The computer system may monitor observations 606 from monitoring unit 412 and, in response to particular observations 606 from monitoring unit 412, delete particular records in the web cache. As an example and not by way of limitation, an observation 606 from monitoring unit 412 may indicate to the computer system that a client 104 recently communicated a database message to a database server 106 modifying contents of one or more web pages. In response to observation 606, the computer system maintaining the web cache may delete from the web cache outdated versions of the web pages.

In particular embodiments, observations 606 on the contents of the SQL statements, the contents of the database messages outside the SQL statements, or both include one or more of the following: (1) information regarding subject database instances of the SQL statements; (2) information regarding vendors of database implementations of the subject database instances; (3) information regarding software and versions of the software in the database implementations; (4) information regarding network protocols and versions of the network protocols used to communicate the database messages; (5) information regarding protocol drivers at database servers 106, versions of the protocol drivers, and application programming interfaces (APIs) at database servers 106 between application layers and network layers used to communicate the database messages; (6) information regarding devices (including, for example, subprocesses and, if applicable, node clusters) hosting the subject database instances of the SQL statements; (7) information regarding hostnames, IP addresses, MAC addresses, and network ports of database servers 106; (8) information regarding operating systems (OSs), versions of the OSs, and attributes of the OSs (such as, for example, patch levels) of devices hosting the subject database instances of the SQL statements; (9) information regarding protocol drivers at clients 104, versions of the protocol drivers, and APIs at clients 104 between application layers and network layers used to communicate the database messages; (10) information regarding devices (including, for example, subprocesses and, if applicable, node clusters) hosting clients 104; (11) information regarding application frameworks at clients 104; (104) information regarding hostnames, IP addresses, MAC addresses, and network ports of clients 104; and (13) information regarding OSs, versions of the OSs, and attributes of the OSs (such as, for example, patch levels) of clients 104.

In particular embodiments, observations 606 on contents of SQL statements, contents of database messages outside the SQL statements, or both include information regarding discovered database system entities (such as for example, database servers 106, database processes, cluster nodes, database instances, namespaces, tables, columns, database users, database sessions, pending operations, hostnames IP addresses, and network ports) and information regarding times and dates of discovery of the database system entities; information regarding active sessions between an observed database instance and processes at clients 104 (such as, for example, information regarding names and addresses of client hosts, information regarding the observed database instance, information regarding a name and an address of a server host, information regarding a database user, information regarding start times and elapsed durations of the sessions); information regarding a number of queries communicated from each of clients 104 to each of one or more database instances (which may include information regarding a rate at which such queries are observed over time); or a combination of such information. Although particular observations 606 on particular contents of SQL statements and particular contents of database messages outside the SQL statements are described, the present invention contemplates any suitable observations 606 on any suitable contents of SQL or other statements and any suitable contents of database messages outside the SQL or other statements.

As part of or based on observations 606, monitoring unit 412 can collect performance data and other information on the database system being monitored (e.g., database system 100 of FIG. 1). The performance data can include number of queries communicated from each of clients 104 to each of one or more database instances (which may include information regarding a rate at which such queries are observed over time), number of queries for a particular database, average response time to queries to a particular database, size of a database, number of queries to a particular database server, average response time by that server, number of a particular query type (e.g., number of write queries), number of rows returned in response to a query, average response time for a query, number of queries issued by a database client, average response time to that client, number of queries for a database table, average response time for queries to a data base queries, number of queries answered by a database server, number of outstanding queries at a database server, average wait time at a database server and other statistics. Additionally, the performance data can include information about the performance of caching provided by query caching unit 410.

Figure 7A:
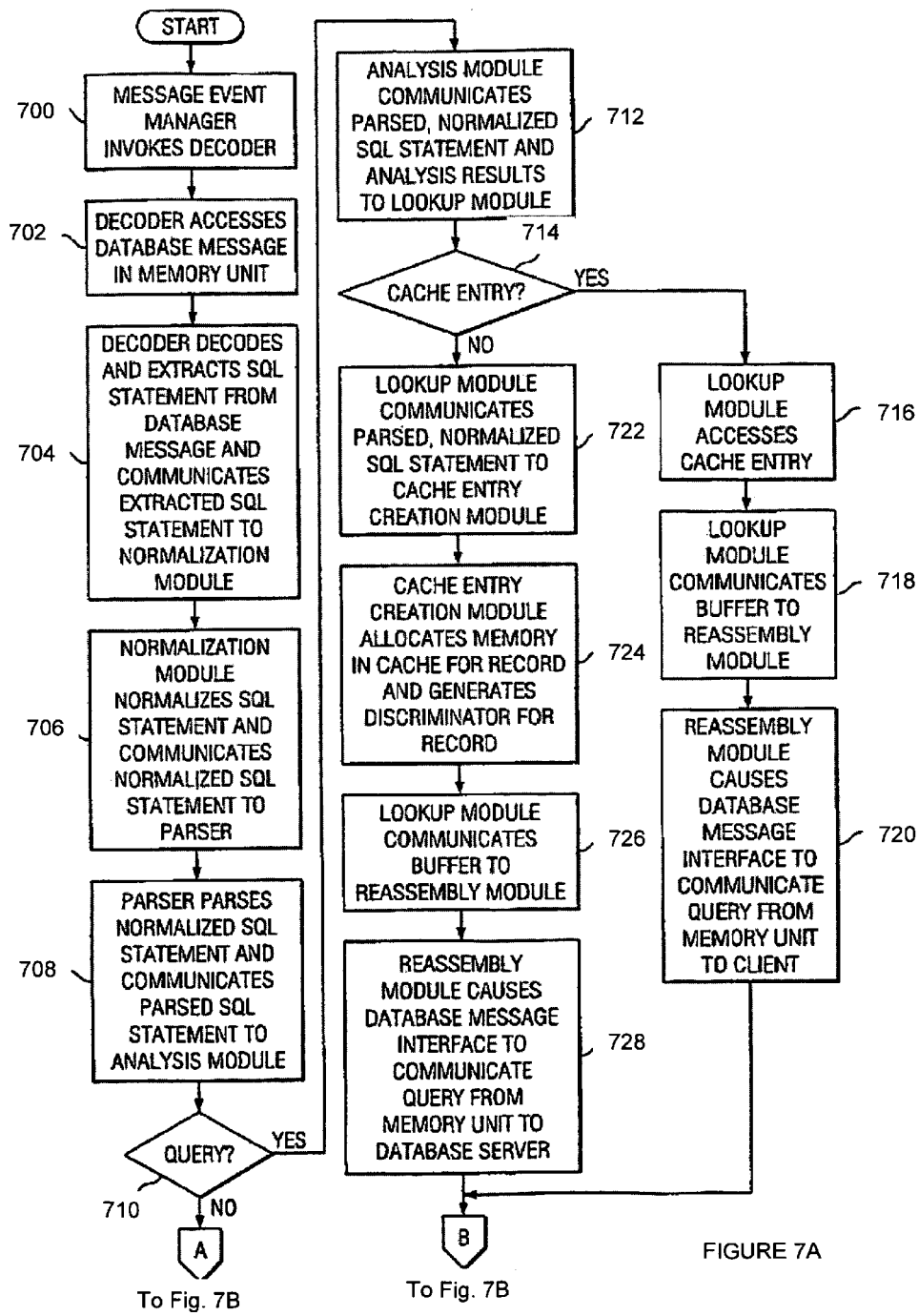
FIG. 7 is a flow chart illustrating one embodiment of a method for query result caching.
Figure 7B:
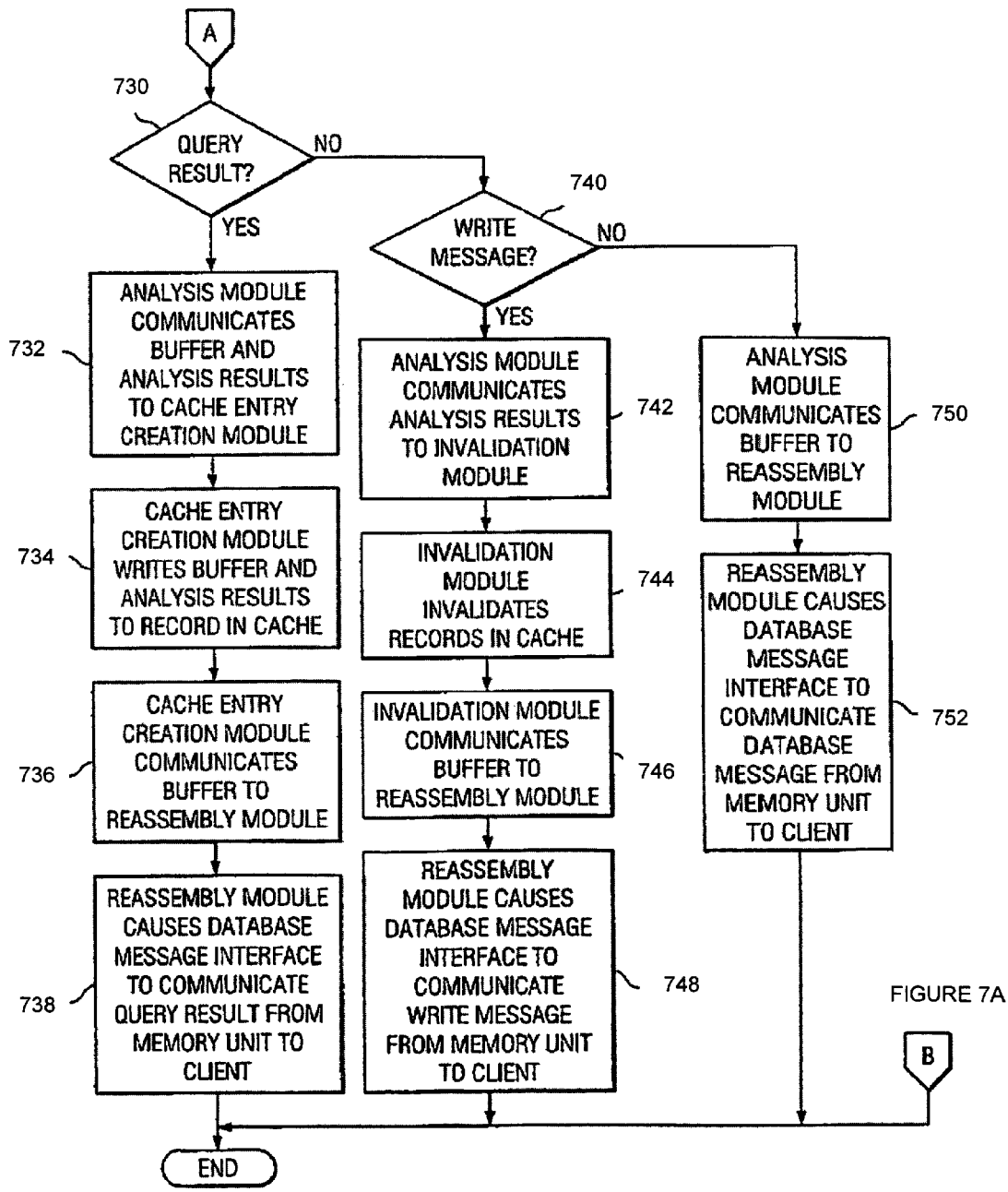

FIG. 7 illustrates an example method for application-layer query-result caching. The method begins at step 700, where, in response to database message interface 402 receiving a database message from a client 104 or a database server 106 and message memory manager 406 writing the database message to memory unit 408, message event manager 406 invokes a decoder 506 in caching unit 410 to decode and extract an SQL statement from the database message. At step 702, decoder 506 accesses the database message in memory 42. At step 704, decoder 506 decodes and extracts an SQL statement from the database message and communicates the extracted SQL statement to normalization module 508 in caching unit 410. At step 706, normalization module 508 normalizes the SQL statement and communicates the normalized SQL statement to parser 510 in caching unit 410. At step 708, parser 510 parses the normalized SQL statement and communicates the parsed, normalized SQL statement to analysis module 512.

At step 710, analysis module 512 analyzes the parsed, normalized SQL statement. If the parsed, normalized SQL statement includes a query, the method proceeds to step 712, where analysis module 512 communicates the parsed, normalized SQL statement and one or more results of analysis of the parsed, normalized SQL statement to lookup module 514 in caching unit 410. At step 714, lookup module 514 looks up a record in cache 504 including one or more query results responsive to the query. If a record in cache 504 includes one or more query results responsive to the query, the method proceeds to step 716, where lookup module 514 accesses the cache entry. At step 718, lookup module 514 communicates a buffer in the cache entry to reassembly module 516. At step 720, reassembly module 516 causes database message interface 402, according to the buffer, to communicate one or more frames including one or more database messages responsive to the query from memory unit 408 to an intended client 104, at which point the method ends.

Returning to step 714, if a record in cache 504 does not include one or more query results responsive to the query, the method proceeds to step 722, where lookup module 514 communicates the parsed, normalized SQL statement to cache entry creation module 518. At step 724, cache entry creation module 518 allocates memory in cache 504 for a record including query results responsive to the query and generates a discriminator for the record. At step 726, lookup module 514 communicates to reassembly module 516 a buffer pointing to the database message in memory unit 408 including the query. At step 728, reassembly module 516 causes database message interface 402, according to the buffer, to communicate the database message including the query from memory unit 408 to an intended database server 106, at which point the method ends. Returning to step 710, if the parsed, normalized SQL statement does not include a query, the method proceeds to step 730. At step 730, if the parsed, normalized SQL statement includes a query result, the method proceeds to step 732. At step 732, analysis module 512 communicates a buffer pointing to the database message in memory unit 408 including the query result and one or more results of analysis of the parsed, normalized SQL statement to cache entry creation module 516.

At step 734, cache entry creation module 518 writes the buffer and the analysis results to a record in cache 504. At step 736, cache entry creation module 518 communicates the buffer to reassembly module 516. At step 738, reassembly module 516 causes database message interface 402, according to the buffer, to communicate the database message including the query result from memory unit 408 to an intended client 704, at which point the method ends.

Returning to step 730, if the parsed, normalized SQL statement does not include a query result, the method proceeds to step 740. At step 740, if the parsed, normalized SQL statement includes a write message, the method proceeds to step 742. At step 742, analysis module 512 communicates one or more results of analysis of the parsed, normalized SQL statement (such as one or more results identifying a subject database instance and a subject table of the SQL statement) to invalidation module 520. At step 744, invalidation module 520 invalidates one or more records in cache 504 according to the results of analysis of the parsed, normalized SQL statement. At step 746, invalidation module 520 communicates to reassembly module 516 a buffer pointing to the database message in memory unit 408 including the write message. At step 748, reassembly module 516 causes database message interface 402, according to the buffer, to communicate the write message from memory unit 408 to an intended client 104, at which point the method ends.

Returning to step 740, if the parsed, normalized SQL statement does not include a write message, the method proceeds to step 750. At step 750, analysis module 512 communicates to reassembly module 516 a buffer pointing to the database message in memory unit 408. At step 752, reassembly module 516 causes database message interface 402 to communicate the database message from memory unit 408 to and intended client 104 or an intended database server 106. Although particular steps in the method illustrated in FIG. 7 are described and illustrated as occurring in a particular order, the present invention contemplates any suitable steps in the method illustrated in FIG. 6 occurring in any suitable order.

Figure 8:
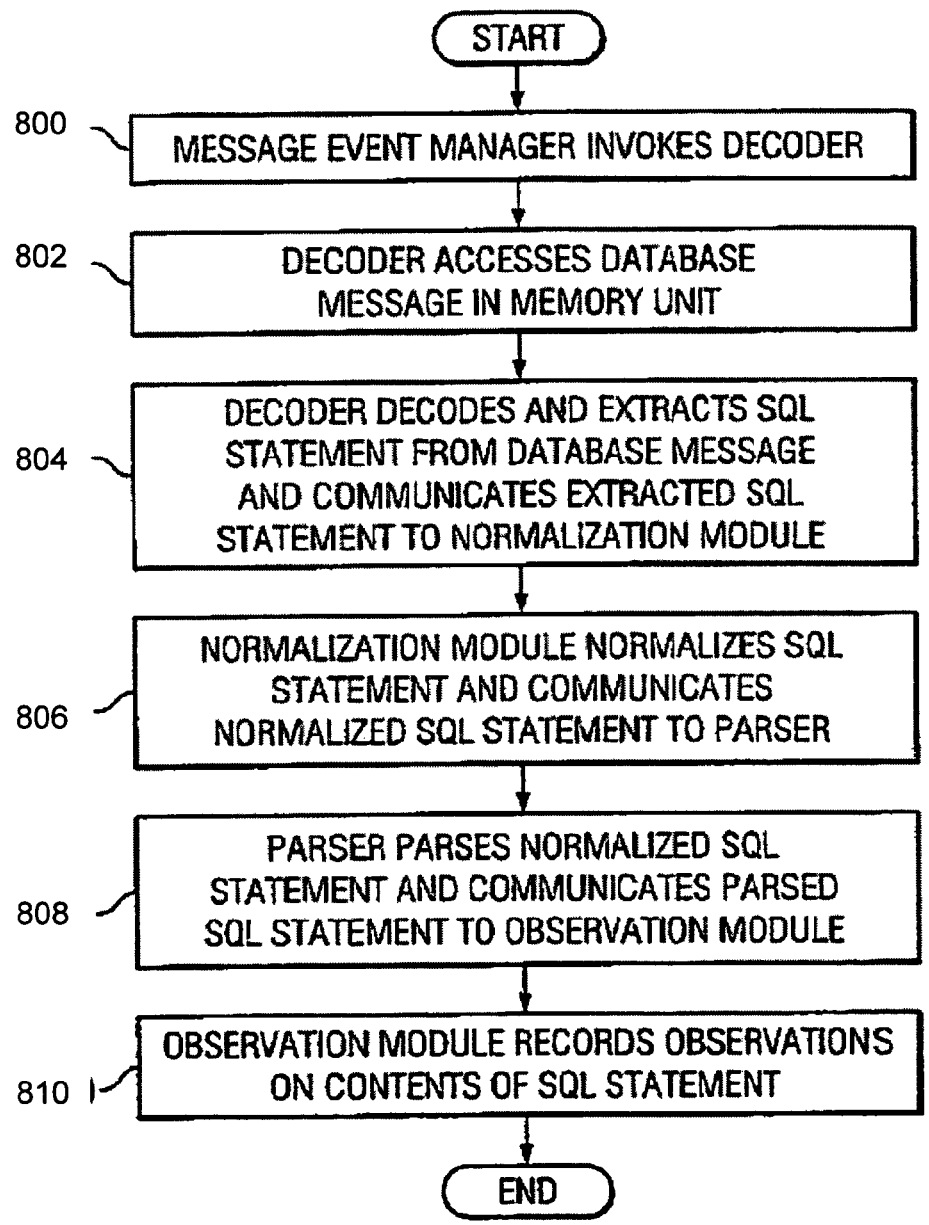
FIG. 8 is a diagrammatic representation of one embodiment of a method for providing application-level monitoring of database transactions.

FIG. 8 illustrates an example method for application-layer monitoring of communication between one or more clients and one or more database servers. The method begins at step 800, where, in response to database message interface 402 receiving a database message from a client 104 or a database server 106 and message memory manager 406 writing the database message to memory unit 408, message event manager 406 invokes a decoder 506 in monitoring unit 412 to decode and extract an SQL statement from the database message. At step 802, decoder 506 accesses the database message in memory 42. At step 804, decoder 506 decodes and extracts an SQL statement from the database message and communicates the extracted SQL statement to normalization module 508 in monitoring unit 412. At step 806, normalization module 508 normalizes the SQL statement and communicates the normalized SQL statement to parser 510 in monitoring unit 412. At step 808, parser 510 parses the normalized SQL statement and communicates the parsed, normalized SQL statement to observation module 604. At step 810, observation module 604 records one or more observations 606 on contents of the parsed, normalized SQL statement as described above and/or stores database performance data, at which point the method ends. Although particular steps in the method illustrated in FIG. 8 are described and illustrated as occurring in a particular order, the present invention contemplates any suitable steps in the method illustrated in FIG. 8 occurring in any suitable order.

Returning briefly to FIG. 4, service manager 415 can communicate with and retrieve database performance statistics or other information from the memory of database appliance 102. According to one embodiment of the present invention, service manager 415 provides a system to archive database performance data (e.g., performance statistics) or other information from a database appliance 102, provide notifications to users and take other control actions based on the data collected by database appliance 102.

Figure 9:
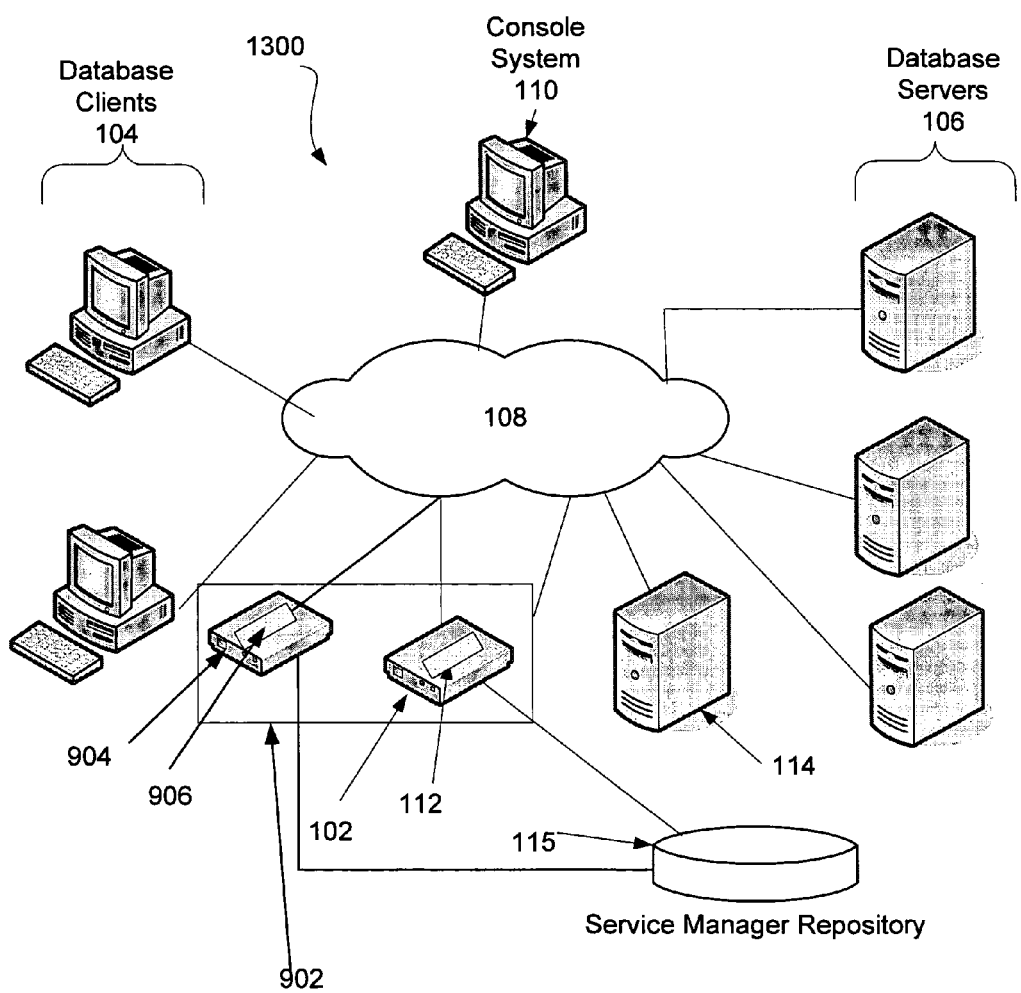
FIG. 9 is a diagrammatic representation of another embodiment of a system in which database applications can be federated.

In the example of FIGS. 1 and 4 discussed above, the service manager takes actions based on the information collected by the corresponding database appliance. However, according to other embodiments of the present invention, there may be multiple database appliances in a system. Two or more of these database appliances can be federated such that one database appliance monitors the other database appliance(s) in the federation. A federation of database appliances can further provide one or more high-availability clusters that provide for deployment of an active/standby pair of database appliances to provide a redundant, fault-tolerant database connection. Each database appliance periodically determines the availability of the other, and if required, the standby database appliance becomes available. FIG. 9 is a diagrammatic representation one embodiment of a system 900 with a federation 902 that includes database appliance 102 and standby database appliance 904 running service manager program 906.

In federation 902, service manager program 112 can be configured to connect to and retrieve data from database appliance 904 and take similar actions as if the data were retrieved from database appliance 102. Thus, service manager program 112 can archive data from database appliances 904 and 102 to service manager repository 115, generate notifications based on data retrieved from database appliances 904 and 102 and perform management tasks based on data retrieved from database appliances 904 and 102. Additionally, service manager program 112 can provide a single point of contact for other database appliances in the federation. Thus, a user can connect to service manager program 112 and provide configuration information for service manager program 112 and service manager program 906. Service manager program 112 can then forward the configuration information to service manager program 906. It should be noted that while only two database appliances are shown in federation 902, any number of database appliances can be federated.

According to one embodiment, federation 902 can be configured as a high-availability cluster in which database appliance 102 acts as the active database appliance and database appliance 904 acts as the standby database appliance. High availability cluster 902 can assigned a virtual IP address that is used for relaying database traffic and by the console program to connect to high availability cluster. The active database appliance handles all traffic to the virtual IP address. The standby database appliance monitors the active database appliance and, if the active database appliance becomes inactive, takes over handling traffic to the virtual IP address.

Either or both of the service manager program at the active appliance or the standby appliance can perform service management tasks. For example service manager program 112 can be configured to archive performance data, generate alerts and perform management tasks based on data collected by database appliance 102 while service manger program 906 can be configured to generate alerts if the status of high-availability cluster 902 changes. For example, if service management program 906 is responsible for service management in the high-availability cluster, service manager program 906 can then monitor the status of high availability cluster 902 and send notifications when certain events or status changes in high availability cluster 902 occur. For example, the user can configure service manager program 906 to send email notifications when service manager program 906 can not connect to the active unit 102 at the virtual IP address, when a successful reconnection to the active unit is achieved, or a change in status at high availability cluster 902 occurs.

It should be noted that while only two database appliances are shown in federation 902, there may be multiple database appliances that are federated such that at least one of the service manger programs monitors the other database appliances in the federation. Moreover, database appliances in particular federation may or may not be configured as one or more high-availability clusters.

Figure 12:
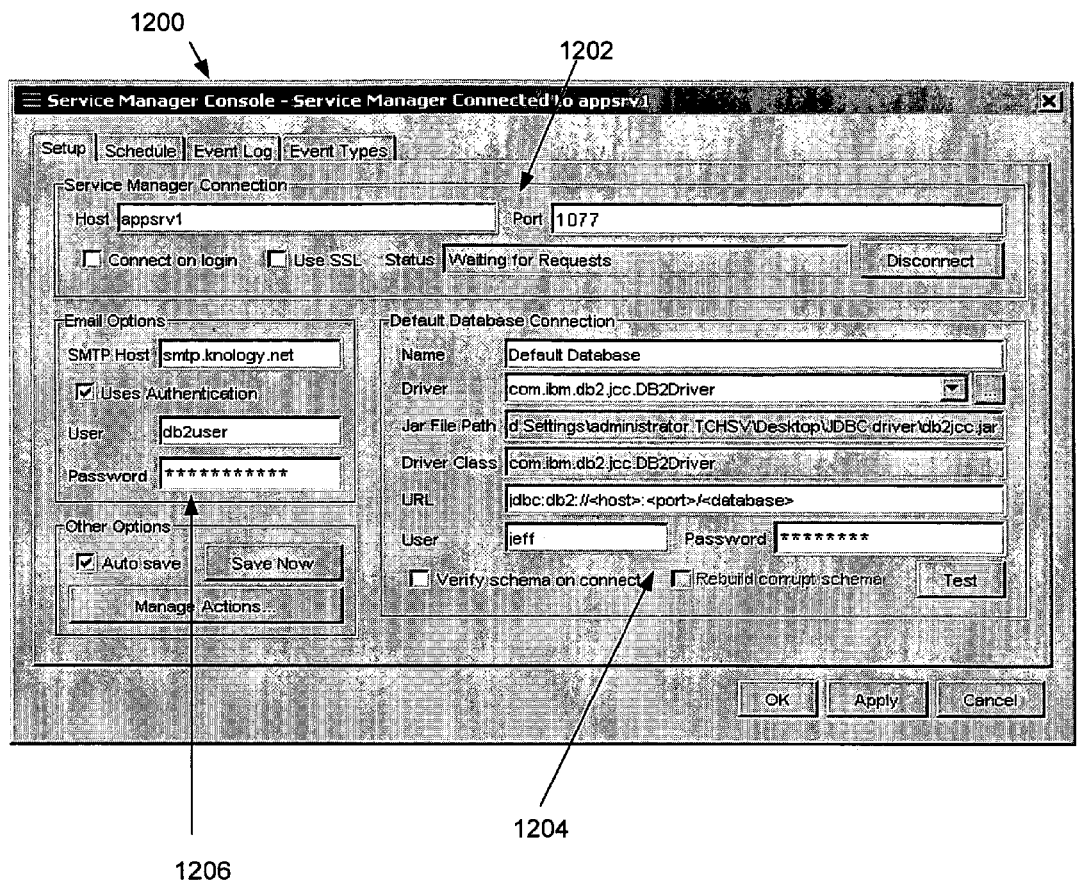
FIG. 12 is a diagrammatic representation of a screen for providing service manager configuration information.

In the previous embodiments of the present invention, a database appliance acted as a service manager. However, according to other embodiments, the service manager may run at an external service manager system. FIG. 10 illustrates one embodiment of an example system 1000 in which one embodiment of a service manager can be implemented in which the service manager is separate from the database appliance(s) being monitored. System 1000, in the embodiment of FIG. 10, includes a service manager 1002 connected to database appliance 102 via network 108. Service manager 1002 can be configured, for example, by console system 110. A user can configure service manager 1001 to access service manager repository 115 so that service manager 1002 can write data to service manager repository 115. FIG. 12, illustrates one embodiment of a screen provided by console system 110 for configuring service manager 1002. In this example, service manager repository 115 is a database, but in other examples, service manager repository 115 can be a file or other data structure stored on a hard drive, optical disk, memory (RAM, ROM, flash memory or other memory) or another computer readable medium. The user can also configure service manager 1002 to access email server 114 to send email alerts. FIG. 12 also provides an example of configuration information to allow service manager system 1002 to access email server 114.

As an example, service manager 1002 can be configured to retrieve data from database appliance 102 every hour on the slowest queries at a particular database server and write the data to service manager repository 115. Additionally, service manager 1002 can be configured to poll database appliance 102 every thirty minutes to determine if the response time for any queries is longer than a predefined threshold. If the response time for any of the queries is over the predefined threshold, service 1002 can notify a user by email using email server 114.

Service manager 1002 can also be configured to implement various database system control functions based on the application of rules to data retrieved from database appliance 102. For example, service manager 1002 can be configured with a rule that specifies that if a particular client attempts to write data to a database (when the client is only supposed to read data from the database), service manger 1002 can access the appropriate database server and change the client's privileges. Service manager 1002 can implement any suitable control functions to change the configuration of database clients, database servers, database appliance 102 or other systems.

Thus, service manager 1002 provides a mechanism to archive data in a database, file or email and alert users when user-configurable performance thresholds have been met. Because the performance data is collected by database appliance 102, embodiments of the present invention can archive performance data and alert users when the performance data meets a threshold without requiring installation of agents or other software on the database clients 104 or database servers 106.

Figure 11:
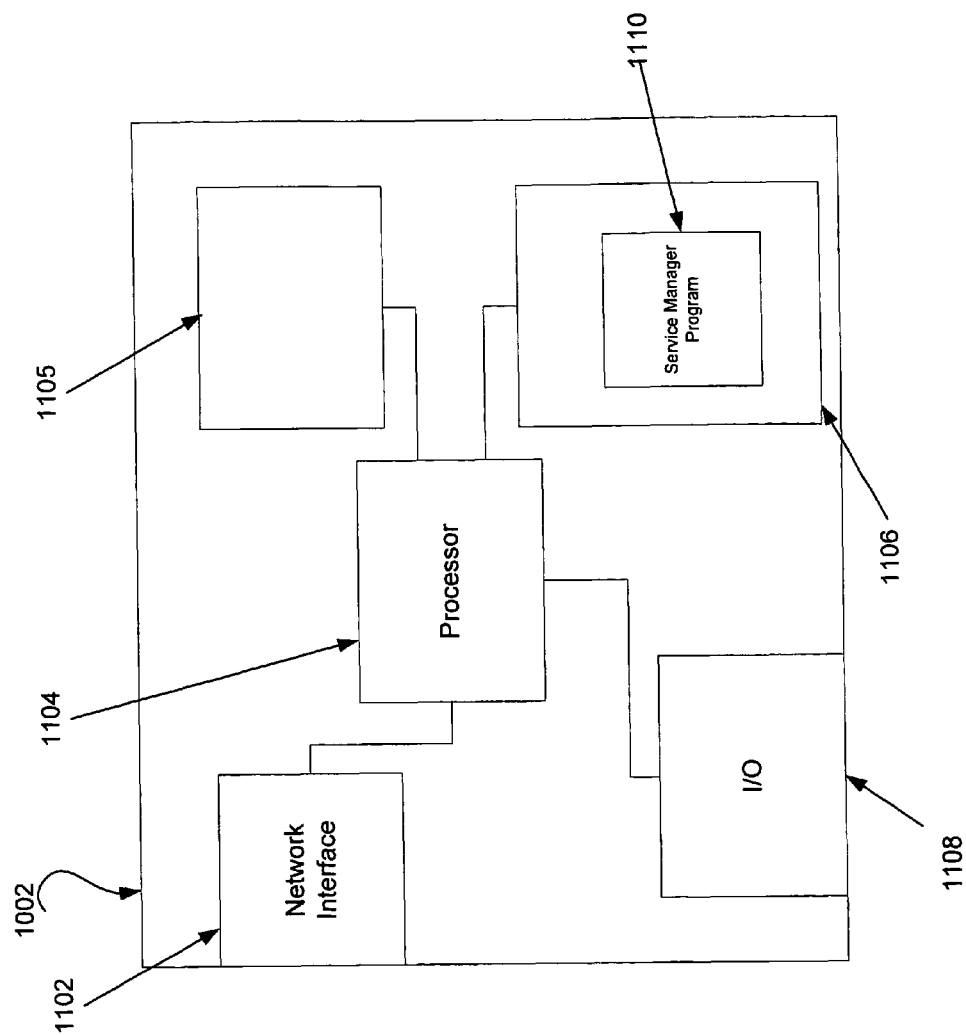
FIG. 11 is a diagrammatic representation of a service manager.

FIG. 11 is a diagrammatic representation of one embodiment of a service manager 1002. Service manager 1002, in this embodiment is a general purpose computer that includes a network interface 1102 (e.g., an Ethernet interface or other interface known in the art), a processor 904 (e.g., CPU, RISC, ASIC or other processor known in the art), a primary memory 1105 (e.g., RAM or other computer readable medium known in the art), a secondary memory 1106 (e.g., magnetic disk, optical disk, RAM or other computer readable medium known in the art) and inputs/outputs 1108 to connect to, for example, a mouse, keyboard, monitor or other input/output device. Secondary memory 1106 can store a set of computer instructions 1110 (e.g., "service manager program 1110"). During execution, service manager program 1110 can be stored in primary memory 1105, secondary memory 1106 or both. It should be noted that the embodiment of FIG. 11 is provided by way of example and service manager 1002 can include a variety of computer components including processors, memories, controllers and other computer components. Service manager 1002 can be implemented on any suitable server, general purpose computer or network device.

Service manager program 1110 can provide a programmatic interface with a console program. As discussed above, this can be implemented through a JAVA™ panel interface using the JAVA™ runtime environment. Through the console program, a user can provide service manager configuration data to service manager 1002. The configuration information can include, by way of example, but not limitation, information to connect to a database appliance (e.g., database appliance 102 of FIG. 10), a service manager repository (e.g., a database such as service manager repository 115 of FIG. 10) and an email server (e.g., email server 114 of FIG. 10). Additionally, a user can provide job descriptions to service manager 1002. Each job description can specify a job that includes information to be collected from database appliance 102, an action to be taken with the collected data and a schedule for performing the job. A job description can also include user defined thresholds against which service manager 1002 can compare items of data (e.g., a performance statistic) collected from database appliance 102 in determining whether to take a specific action. In yet another embodiment, the job description can specify rules to apply to data retrieved from database appliance 102 and actions to be taken if the rules are satisfied to manage various aspects of the database system being monitored. The action can include, for example, logging into database servers to change user and database client profiles, add, delete or update information stored in a database, logging into database clients (e.g., application servers) to change the configuration of the client, logging into other computer systems (e.g., web servers) to notify the computer system of an event or other action.

Service manager 1002 stores configuration information and job descriptions in one or more files, records or other suitable data structures. For example, service manager 1002 can store configuration data in a file in nonvolatile memory that is loaded each time service manager program 1110 is executed. Thus, if service manager program 1110 is automatically executed at startup or reboot (e.g., as part of a .bat file), service manager 1002 can connect to the appropriate database appliance(s), database(s) and email server(s) specified in the file without reconfiguration after power cycling, reboot or other event that clears volatile memory. Job descriptions can also be saved in non-volatile memory so that they are maintained across such events. The set of job descriptions and configuration information maintained by service manager 1002 can be updated as the user changes the job descriptions and configuration information.

Service manager 1002, according to one embodiment of the present invention, queues the jobs provided by the job descriptions. The jobs can be queued in an event driven queue that contains events corresponding to various phases of each job or according to other queuing mechanisms known in the art. When it is time to perform a particular job, service manager program 1110 connects to the appropriate database appliance interface layer (e.g., using a web server interface or other network interface) and requests the performance data or other information specified in the job description. When service manager 1002 receives the information from the database appliance, service manager program 1110 performs the defined task. This can include, for example, archiving the information to a comma-separated value ("CSV") file, a database or other data storage structure, comparing a collected piece of data to a predefined threshold and, if the threshold is met, providing a notification to a user, or performing a control function based on the application of rules to the data collected from the database appliance.

As one example, a user can provide a job description that specifies that service manager 1002 should collected "slowest query" data every hour and send a notification to a particular email address if there is a query for which the response time exceeded a particular, threshold. Every hour, service manager 1002 can collect the slowest query data from the database appliance and compare the response time to the predefined threshold. For each query in the hour period for which it took longer than the threshold time to respond, service manager 1002 can send a notification to a user (e.g., as a single notification or a separate notification for each query for which the response time took over the threshold). Notification can take the form, for example, of an email, an SNMP trap, a web based communication or other notification.

It should be noted that the embodiment of service manager 1002 described in conjunction FIG. 11 is provided by way of example and service manager 1002 can be collocated with the console system or database appliance. Additionally, service manager 1002 can provide its own user interface such that users connected to service manager program 1110 without the use of a separate console program or web browser. Service manager 1002 can be an "always on" system for providing archiving and notification. Consequently, performance data can be continually collected and archived, and users (e.g., systems administrators) provided with notifications even if console system 110 is not being monitored.

FIG. 12 is a diagrammatic representation of one embodiment of a screen 1200 for a GUI for providing configuration information to a service manager. In the embodiment of the FIG. 12, service manager 1002 can connect to one or more database appliance to collect data, an email server to provide notifications and a database to archive data. As discussed above, screen 1200 can be presented to a user at console system 110 that connects to a service manger (e.g., at database appliance 102 or an external service manager 1002) via a network connection or other communications link.

Host area 1202 of screen 1000 allows a user to specify connection information for the service manager. The service manager, in this example, has the local host name "appsrv1" and listens on port 1077 for communications from the console program. Service manager repository area 1204 allows the user to specify a repository for archiving information collected from the database appliance. In the example of FIG. 12, the service manager repository is an external-database. In other embodiments of the present invention, the service manager repository can be a file or database on a local or networked drive or other data storage mechanism. Notification area 1206 allows a user, to specify information for an email server so that the service manager can access the email server to send notifications via email to users when predetermined conditions are met. It should be noted that in other embodiments of the present invention, the service manager can provide notifications in other suitable manners. Other configuration information can include, for example, the port over which service manager 1002 connects to the database appliance, information to connect to database servers (e.g., database servers 106) and database clients (e.g., database clients 104) or other suitable configuration information.

Figure 13:
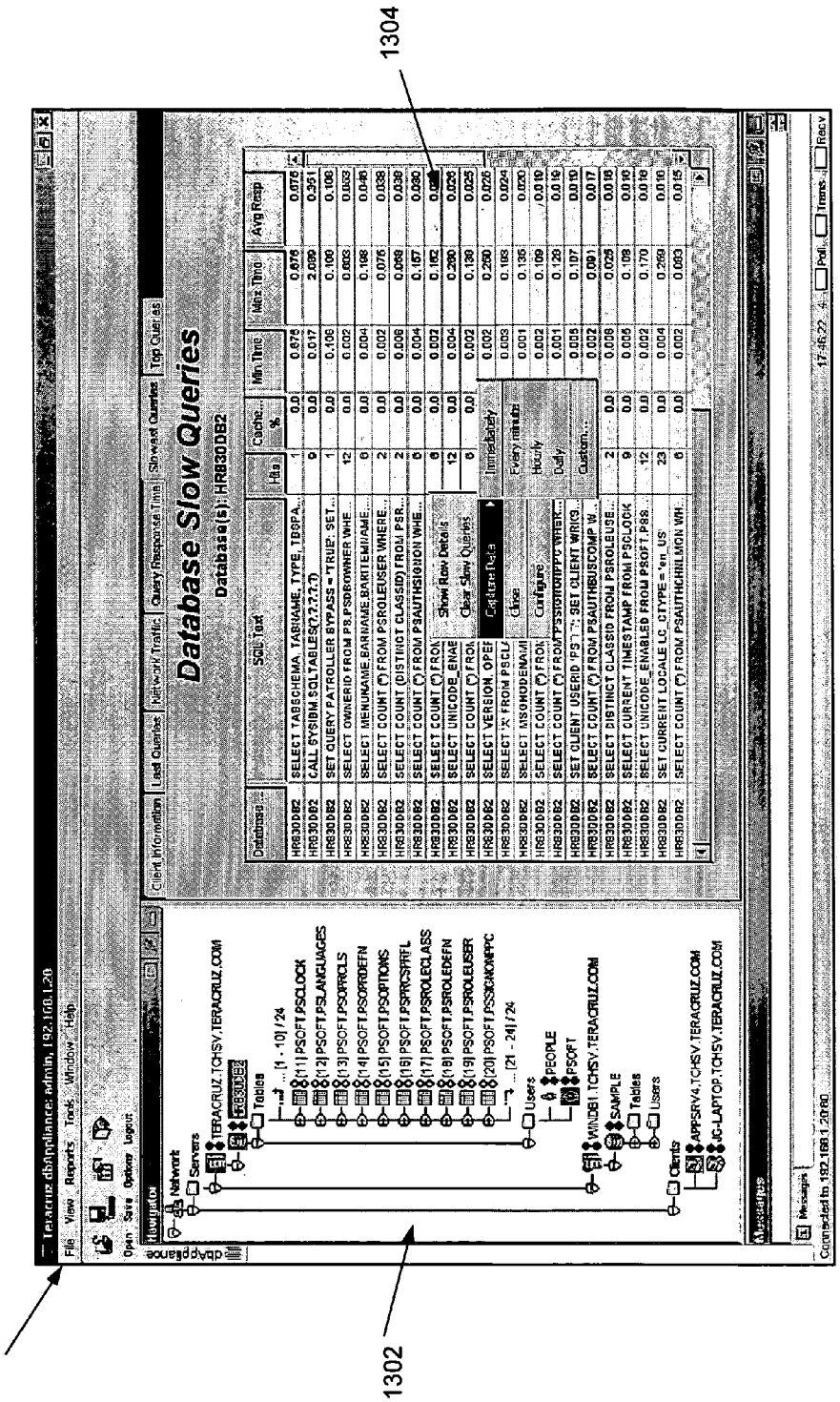
FIG. 13 is a diagrammatic representation of a console screen for displaying a report and providing a job description.

FIG. 13 is a diagrammatic representation of a screen 1300 displayed by a console program at console system 110 to report information collected by database appliance 102 to a user. As will be described below, the graphical user interface of FIG. 13 can be used to input job descriptions when the console program is connected to the service manager. In the example screen of FIG. 13, information about the database system being monitored is provided in a navigation window 1302 that provides a tree structure for examining servers and clients. Navigation window 1302, the example of FIG. 13, shows the server "TERACRUZ.TCHSV.TERACRZ.COM" running the databases "HR830 DB2" and the database server "WINDB1.TCHSV.TERACRUZ.COM" running the database "SAMPLE". Navigation window 1102 also shows the clients "APPSRV4.TCHSV.TERACRUZ.COM" and "JG-LAPTOP.TCHSV.TERACRUZ.COM". The monitoring window 1304 displays reports, graphs, tree-graphs or other mechanism for conveying performance data to a user.

In the example of FIG. 13, a "Slow Queries" report for the database "HR830 DB2" is illustrated. This report represents performance data collected and stored by database appliance 102 based on database messages accessed by database appliance 102. Other example reports include "Active Sessions", "Cache Statistics", "Client Information", "Client Socket Status", "Last Queries", "Network Traffic", "Last Queries", "Pending Queries", "Query Rates", "Query Response Time", "Query Types", "Server Information", "Server Socket Status", "Slow Queries", "System Overview", "System Performance", "System Status", "Table Accesses", "Top Queries" or other suitable reports. Each report type can optionally include reports for the different elements shown in navigation window 1102. For example, the "Top Queries" reports can include "Top Queries (Server)", "Top Queries (Database)", "Top Queries (User)" and "Top Queries (Client)" reports. Example performance data collected for these reports is described below, but it should be noted that these reports are provided by way of example and other suitable reports for reporting various database performance data can be implemented.

The Active Sessions report provides detailed information about the active sessions of the database system captured by database appliance 102. This report includes the client, database, user, and server names associated with the active session. This report also lists the duration of the session and total number of table accesses, and indicates the cache status per session. The cache status indicates whether the system elements and settings are conducive to query result caching for the session. If caching is enabled globally and enabled for the session server, database, client, and user, then the status shown will be enabled. If the global setting or any one of the session elements are not cache enabled, then the status will be shown as Disabled. Further, caching can also be enabled at the table level to enable query result caching, but the Active Session Cache Status does not, according to one embodiment, reflect cache enable settings at the table level due to the dynamic nature of table cache settings.

The Cache Statistics report shows the percentage of cached accesses and the number of cached entries and cached flushes (invalidations) over the period. The period can be changed by the user. Recall that cache statistics can be provided by caching unit 410 to monitoring unit 412 of database appliance 102 for storage with other database performance data.

The Client Information report provides detailed information about the client computer including name, IP address, operating system, and time when the client was discovered and last accessed.

The Column Accesses report shows the number of accesses made to a table column over a period configured on the Time Series Configuration dialog. Column accesses are summed for the icons in navigator window 1302. For example, selecting a database entry in navigator window 1302 sums all column accesses for tables within that database.

The Last Queries report displays the last fifty queries against the server, database, user, or client as selected in navigator window 1302. This report also provides the element name (e.g., server name, client name etc.), the last query text, and the start time, overall duration and client wait time of the last queries received. The Cache Hit column indicates where the statement response came from: Cache Hit equals true, if it came from the appliance query result cache, or Cache Hit equals false, if it came from the database server.

The Network Traffic report displays the amount of traffic to/from the client and to/from the server for a specified time period.

The Pending Queries report displays the queries pending on the server, database, user, or client as selected in navigator window 1102. This report also provides the query text, and the pending start time and duration of the pending query. The Cache Hit column indicates where the statement response is coming from: Cache Hit equals true, if it is coming from the appliance query result cache, or Cache Hit equals false, if it is coming from the database server.

The Query Response Time report displays the query response time for the server selected in navigation window 1002. Response, time for query type is indicated by the color legend for selects, inserts, updates, and deletes. Response time for other types of statements is represented by Other Response Time.

The Query Traffic report displays select count active sessions and select responses on the DBMS for the period set on the Time Series Configuration dialog. This report shows the number of queries received by the server and the number of sessions active against server during the configured response time.

The Query Types Over Time report shows the percentage of query types made against a server, database, table, user, or client over a period of time.

The Server Information report provides detailed information about the server computer including name, IP address, operating system, and the time when the server was discovered and last accessed.

The Slow Queries reports indicate the slowest executing statements grouped by the server, database, user, or client as displayed on the report and selected in the navigation tree. According to one embodiment, there can be variants of the Slow Queries report. The report titled simply "Slow Queries" is based on total statement duration, with no regard for client side versus server side delays. The report titled "Slow Queries (Client)" is based on the time spent waiting on the client to fetch more data, without regard for server response time. The new report titled "Slow Queries (Server)" is based on the time spent waiting on the database server, with no regard for client side wait time. All of these reports, according to one embodiment, also provide the number of times each query was received; the minimum, maximum and average response time times for each query; and the last time the query was received for the time period that the appliance was powered on or since the Slow Queries report was reset. The Cache % column indicates the percentage of time the statement response was retrieved from the appliance query result cache.

The System Overview report is a default dashboard, or a collection of reports. The report can be configured to define a unique snapshot of the database system being monitored system.

The System Status report describes the database appliance system. Including the name of the database appliance, a user Name that identifies a user to the database appliance, an uptime amount and date of time the database appliance has been active, whether the cache mode is enabled or disabled, the number of cache entries processed by the database appliance, the number of active sessions, and the amount of RAM provided by the database appliance.

The Table Accesses Statistics report displays the number of table accesses and joins for the table as displayed on the report and selected on navigation window 1002 for a specified time period.

The Top Queries report indicates the queries most frequently received by the server, database, user, or client as displayed on the report and selected in the navigation tree. This report also provides the number of times each query was received, the minimum and maximum amount response time, the average amount of response time for each query, and the last time the query was received for the time period that the appliance was powered on or since the Top Queries report reset was issued by the Clear Top Queries selection in the report Configuration dialog. The Cache % column indicates the percentage of time the statement response was retrieved from the appliance query result cache.

According to one embodiment, the database appliance 102 can collect statistics and other database performance data for particular windows of time. The database appliance, in one embodiment, captures time sensitive statistics in three modes: minutes, hours, and days. A minute-based report shows the activity over the last 60 minutes from the current time. An hour-based report shows the database activity over the last 24-hours. Day-based reports (configurations) show database activity over the last 60 days from the current time. Minute reports are updated once per minute at the end of each minute period, enabling the user to look back at minute averaged data for the last 60 minutes. The user can configure the time window (time history duration) in these reports for minute, hour, or day reporting. Hour reports are updated at the end of each hour, enabling the user to look back for 24 hours. Day reporting averages activity over day increments and is only updated once per day. According to one embodiment, minute based reports displayed in monitoring window 1104, do not report traffic instantaneously. If a query is posted to the database, the appliance will include that query at the end of the next minute.

The user can input a job description by right-clicking in monitoring window 1104 on a report and selecting "capture data". As shown in the example of FIG. 11, the user can then select an archiving schedule (e.g., immediately (real-time), every minute, hourly, daily or according to a custom schedule). The job description of capturing a specific set of data— the slow queries for database HR830 DB2 in this example—according to a particular schedule is communicated from the console program to the service manager program. In response to receiving the job description, the service manager program can queue the job according to the schedule or carry out the job immediately. At the scheduled time(s), the service manager will poll the database appliance 102 for the slow queries data for database HR830 DB2 (or other data) and write the data to the service manager repository defined in the configuration information.

According to particular embodiments, the service manager archives collected data (i.e., archives the reports according to the job description) to tables in a database. Since reports are context sensitive in that they can depend on the network element selected in navigation window 1102, the database tables can also be context sensitive. For example, the Slow Queries Report can be requested for servers, databases, users or clients. The table used for archiving data for the Slow Queries Report can depend on whether the Slow Queries Report in monitor window 1102 displays server, database, user or client data. If the Slow Queries report is archived for a database, a DATABASES,DATABASE_SQL_STATUS table can be used. Each time data is collected from the database appliance, service manager 112 can insert rows to add the new data to the DATABASES,DATABASE_SQL_STATUS table, time-stamped at the time the data is collected from the database appliance.

As an example, a user can right-click on the Slow Query report for the HR830 DB2 database and select "capture data" every minute. On receiving this job description, service manager 112 can schedule to retrieve "Slow Query" data for the HR830 DB2 database from database appliance 102 each minute. From this point forward until the job is cleared, the service manager can poll database appliance 102 and update a DATABASES,DATABASE_SQL_STATUS with Slow Query data from the database appliance, time stamped for the time of collection.

Figure 14A:
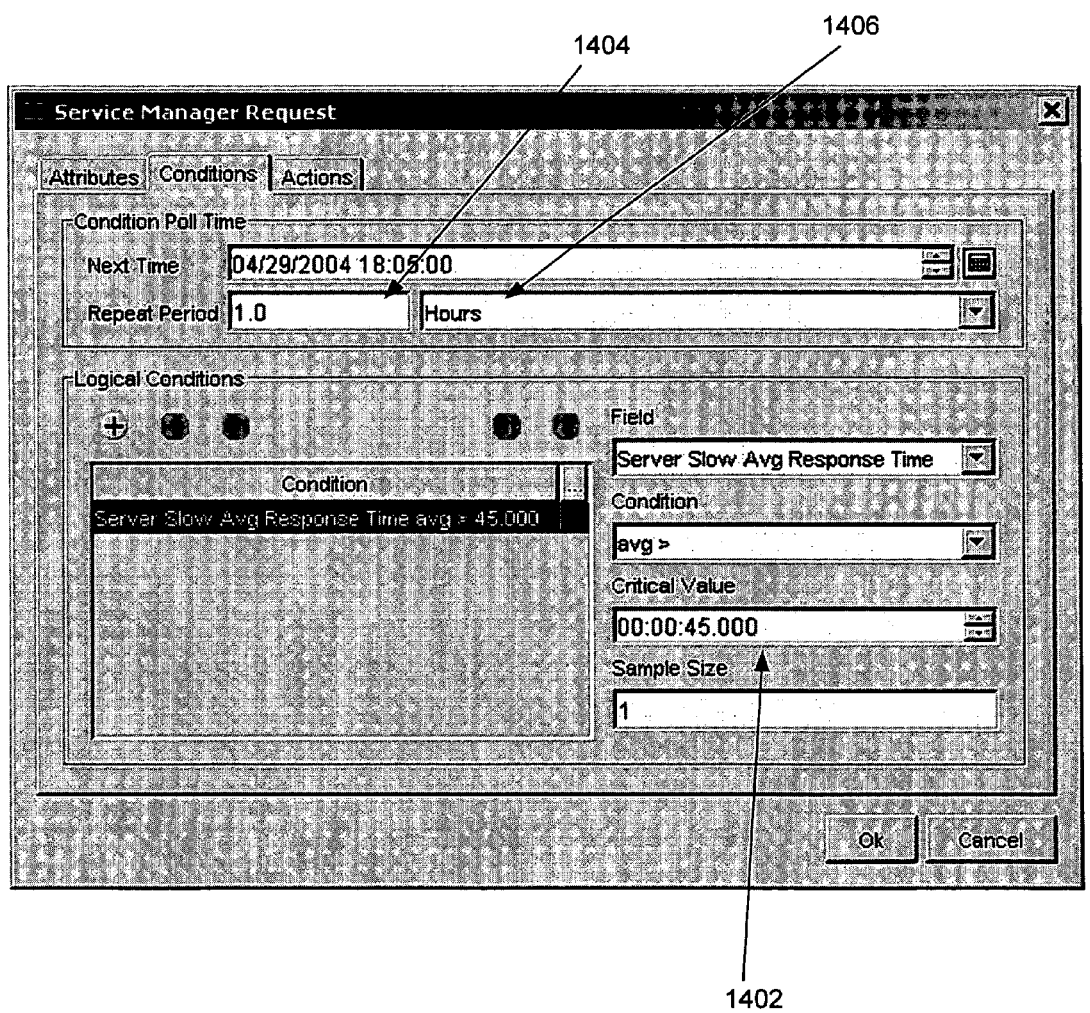
FIGS. 14A-D are diagrammatic representations of screens for providing a user defined threshold and defining a notification type.
Figure 14B:
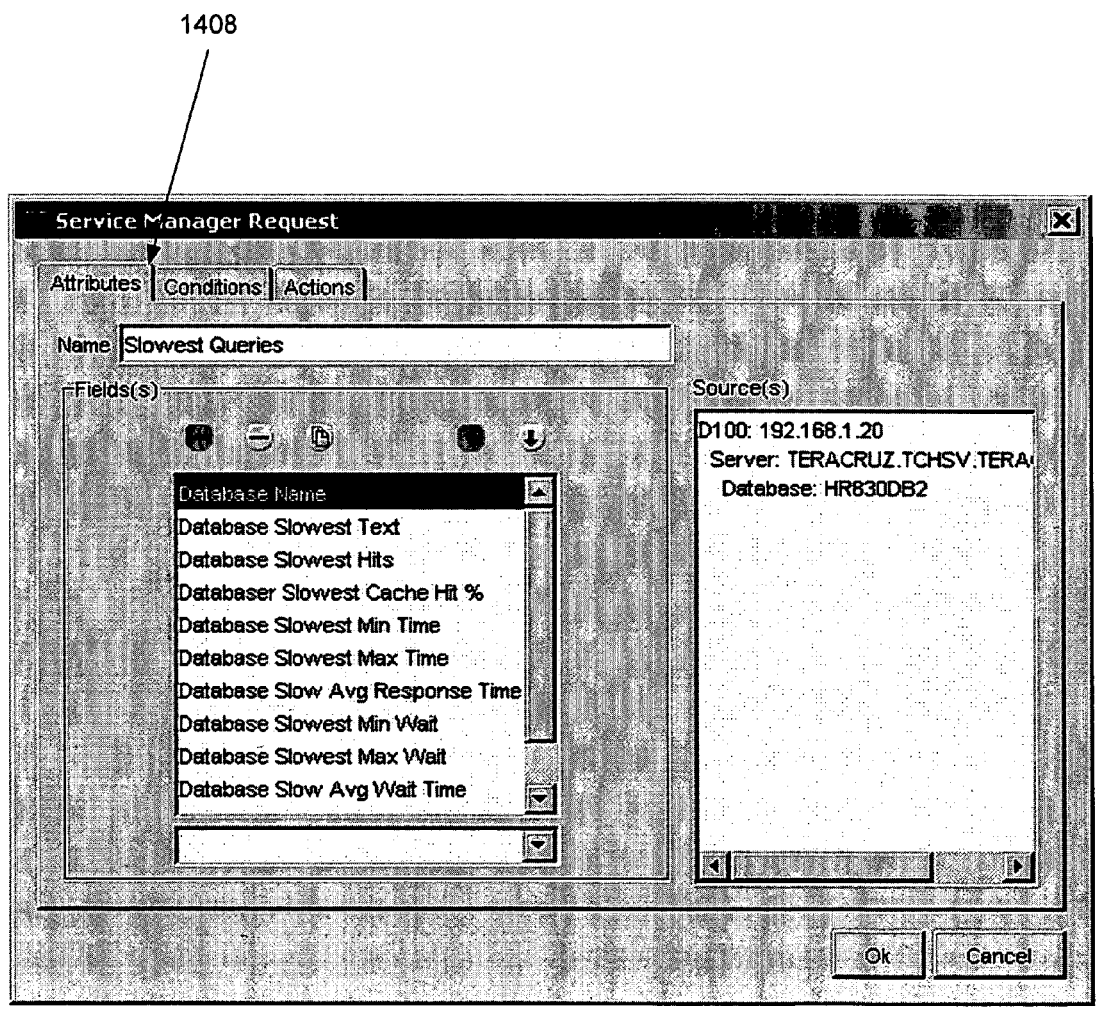
Figure 14C:
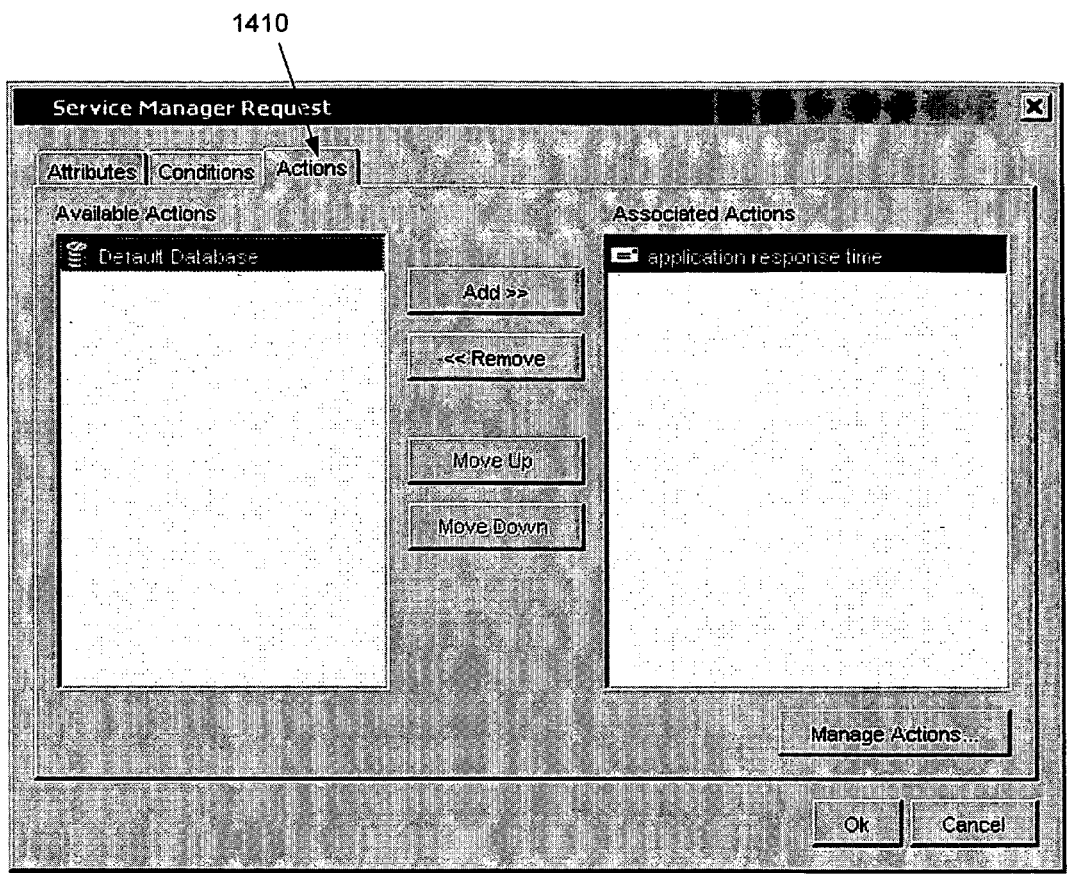
Figure 14D:
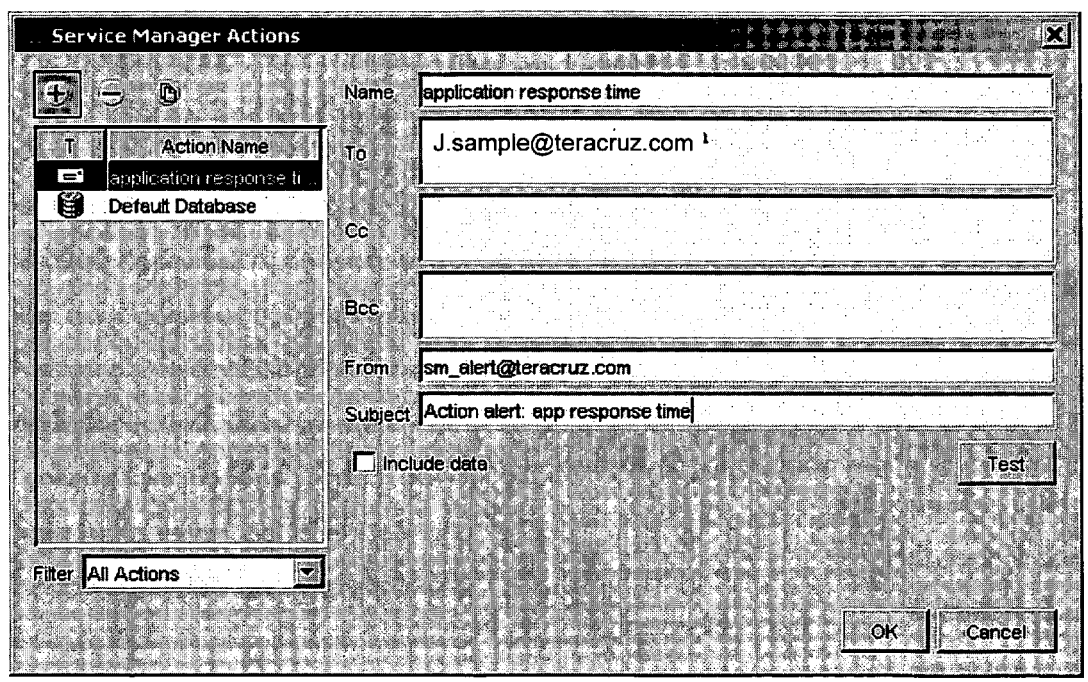

A user can also provide job descriptions that define conditions to trigger service manager 112 to send an alert or notification. Using the example of the "Database Slow Queries" report of FIG. 13, the user can right-click on the monitoring window 1304 and select custom. The user can then define a threshold for the notification, the attributes of the notification and the type of notification. As an example, FIG. 14A illustrates a user defining that a notification should occur when the server average slow response time exceeds 45 seconds (shown in field 1402). Additionally, the user can define that service manager should poll the database appliance every hour (fields 1404 and 1406) to determine if the slow average response time exceeds 45 seconds. FIG. 14B illustrates a notification attributes window 1408. For example, for each query for which the average slow response time is greater than 45 seconds, one or more of the following attributes can be reported: database name, query text (e.g., SQL text), cache hits percentage, minimum time, maximum time, average response time, minimum wait time, maximum wait time, average wait time and other suitable attributes. FIG. 14C illustrates an actions window 1410 defining the type of notification or alert service manager 1002 should send. In this example, if the notification or alert is triggered based on the defined, threshold of 45 seconds, the service manager will send an email to the specified address having the attributes selected by the user in the attributes window 1408. FIG. 14D illustrates an example of specifying an email address to which to send the notification selected in FIG. 14C.

The console program can send the job description with the user defined threshold, notification attributes and notification action to the service manager program. The service manager program, in this example, will poll the database client every hour for slowest query information for the HR830 DB2 database and send a notification reporting each query that had an average response time exceeding 45 seconds.

Additionally, the console program can allow the user to define control functions that can be carried out by the service manager. For example, a user can define that if a particular client makes more than a certain number of queries to a database, the service manager should logon to the appropriate database server and change the client (or user) profile at the database server to deny further access. It should be noted that the control functions can include any arbitrarily defined action that the service manager can take to provide notifications, change the configurations of the database servers, database clients, database appliance, the service manager itself or other action.

Thus, a service manager can access (locally or over a network connection) database performance data collected by a database appliance and store the database performance data to a service manager repository. Additionally, the service manager can compare at least one item of the database performance data to a predetermined threshold, and if the threshold is met, notify a user that the item of performance data has met the threshold. Moreover, the service manager can compare collected data to control rules to determine if the service manager should take a control action. If the control rule is satisfied, the service manager can take the control action. Unlike previous database monitoring systems, this can be done without the need to collect data from distributed software agents that reside at each database client and database server.

Figure 15:
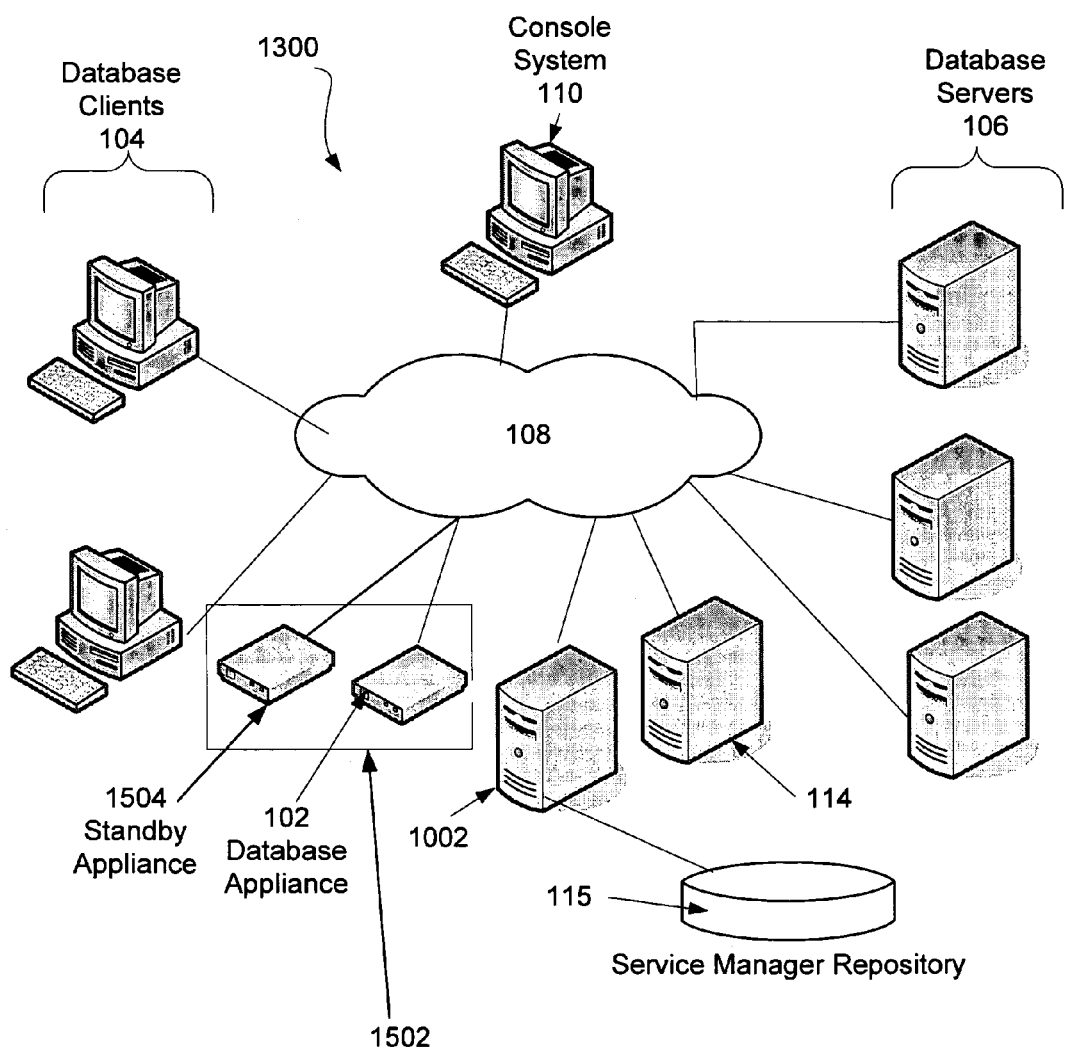
FIG. 15 is a diagrammatic representation of a system for monitoring a high availability cluster.

In the previous embodiment of an external service manager, the service manager is described as monitoring a particular database appliance. However, each service manager may monitor multiple database appliances and multiple service managers may monitor a single database appliance. In particular embodiments, multiple database appliances can be configured in a high availability cluster. As described above, high availability clustering allows deployment of an active/standby pair of database appliances to provide a redundant, fault-tolerant database connection. Each database appliance periodically determines the availability of the other, and if required, the standby database appliance becomes available. FIG. 15 is a diagrammatic representation one embodiment of a system 1500 with a high availability cluster 1502 that includes database appliance 102 and standby database appliance 1504.

High availability cluster 1502 is assigned a virtual IP address that is used for relaying database traffic and by the console program and the service manager program to connect to high availability cluster. The active database appliance handles all traffic to the virtual IP address. The standby database appliance monitors the active database appliance and, if the active database appliance becomes inactive, takes over handling traffic to the virtual IP address.

A user can configure service manager 1002 (e.g., using console system 110) with the virtual IP address of high availability cluster 1502. Service manager 1002 can then monitor the status of high availability cluster 1502 and send notifications when certain events or status changes in high availability cluster 1502 occur. For example, the user can configure service manager 1002 to send email notifications when service manager 1002 can not connect to the active unit at the virtual IP address, when a successful reconnection to the active unit is achieved, or a change in status at high availability cluster 1502 occurs.

Figure 16A:
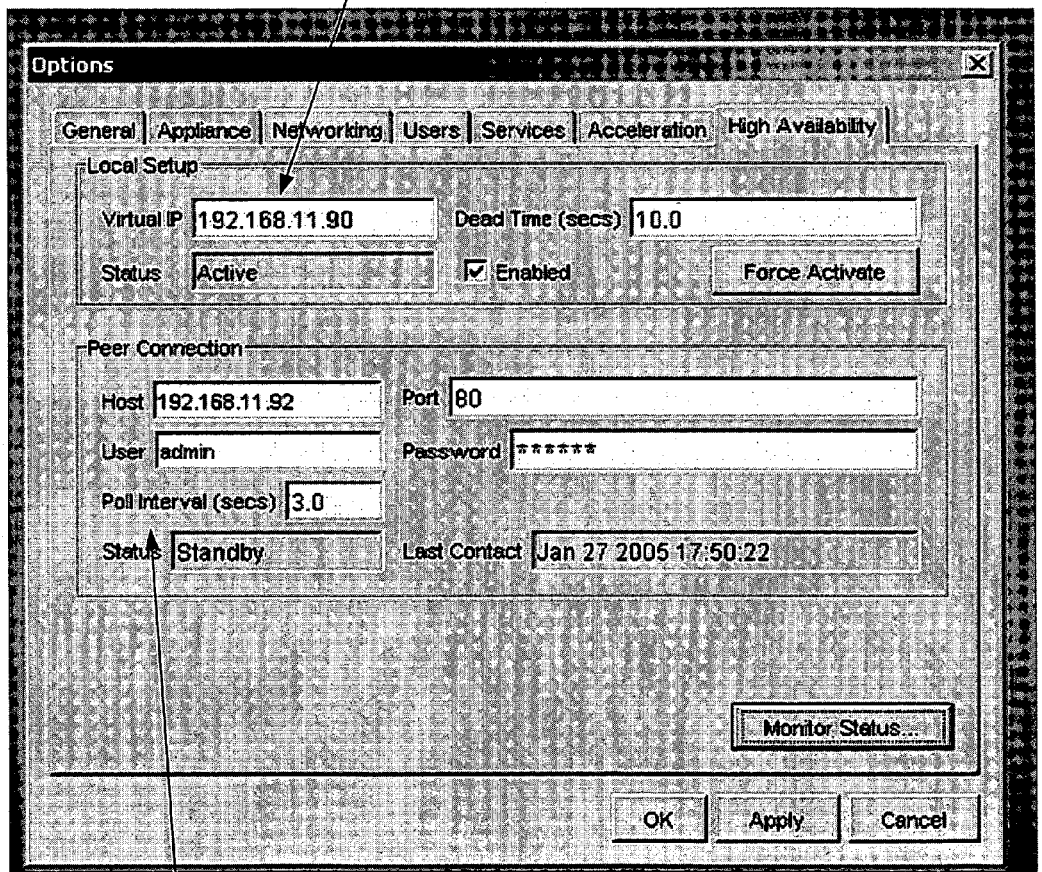
FIGS. 16A-C are diagrammatic representations of screens for configuring a service manager to monitor a high availability cluster.
Figure 16B:
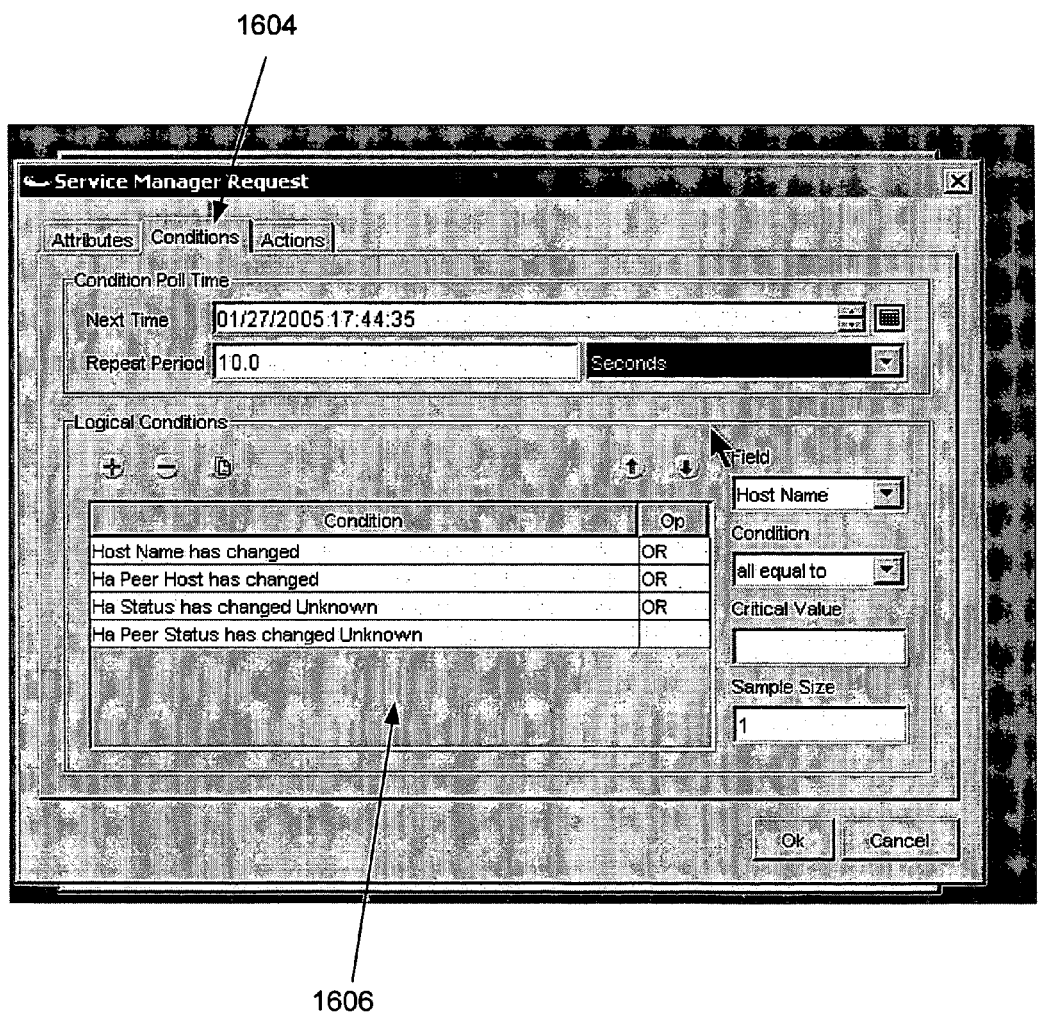
Figure 16C:
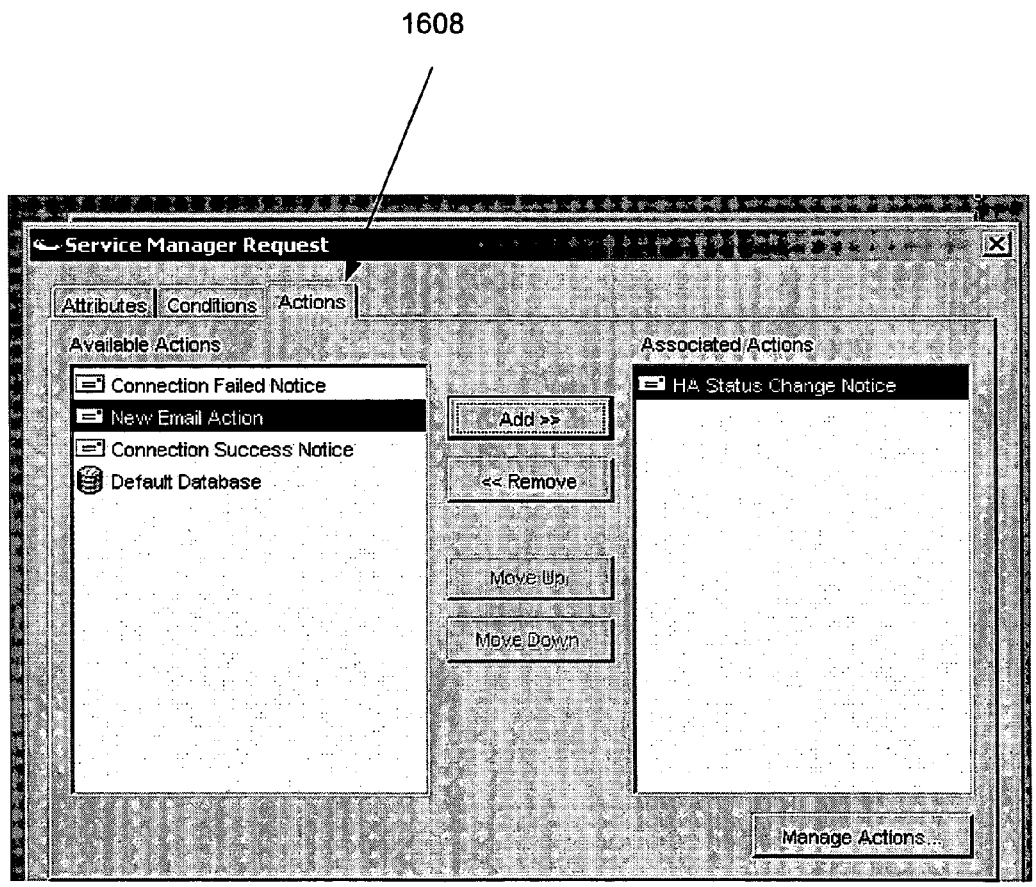

FIG. 16A illustrates one embodiment a screen 1600 for providing configuration information to a service manager for a high-availability cluster. As shown in field 1602, the user can provide the virtual IP address of the high availability cluster and other connection information (e.g., port and password for connecting to the database appliances and other connection information). Area 1603 allows the user to enter information for connected to the peer (i.e., standby) database appliance. FIG. 16B illustrates a screen 1604 for defining thresholds for notifications based on the status of the high-availability cluster. In this example, the service manager will generate a notification when any of the conditions in box 1606 are met. FIG. 16C illustrates a screen 1608 for defining the notification type as an email (represented at 1410). As with the previous examples, the job description for providing notifications based on the status of the high availability cluster can be input at console system 110 and communicated to the service manager. The service manager can queue the job and process the job at the scheduled times (e.g., according to a specified polling frequency) to determine the status of the high availability cluster. If a status change has occurred and the conditions specified in the job description are met, the service manager can generate the notification specified in the job description.

In the particular embodiments described above, the service manager is separate from console system 110 and database appliance 102. However, in other embodiments of the present invention, the same general computer system that acts as console system 110 can run the service manager program. In yet another embodiment of the present invention, the service manager program can run on database appliance 102 as described in conjunction with FIG. 1.

Figure 17:
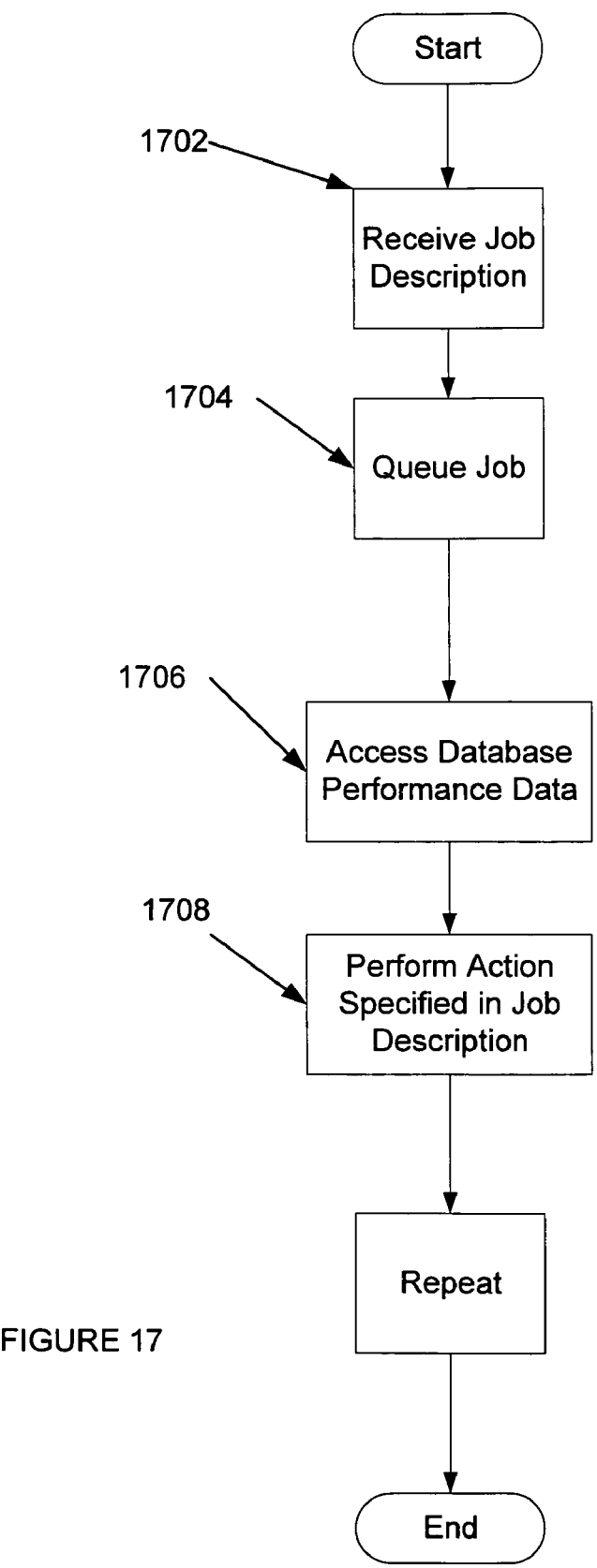
FIG. 17 is a diagrammatic representation of one-embodiment of a service manager method.

FIG. 17 is a flow chart illustrating one embodiment of a method for providing service management in a database system according to one embodiment of the present invention. The method of FIG. 17 can be implemented by executing a set of computer instructions stored on a computer readable medium (e.g., RAM, ROM, Flash memory, magnetic disk, optical disk or other computer readable medium). It is assumed for purposes of FIG. 17 that the service manager is configured to connect to or is part of a database appliance and can retrieve database performance data and other information from the database appliance.

At step 1702, the service manager can receive a job description that includes, for example, a set of performance data to be collected from the database appliance, a collection schedule and one or more actions to take with the collected performance data. The job description can further include one or more thresholds against which to compare items of the performance data. At step 1704, the service manager can queue the job specified in the job description according to the schedule.

At the appropriate time (e.g., immediately, each minute, each hour, daily), the service manager can access the database performance data or other information specified in the job description from the database appliance (step 1706). This can include requesting the specified data over a network or other communications link, accessing the data from the database appliance's memory or otherwise accessing the data from a remote or local memory location.

The service manager, at step 1708, can take the action specified in the job description. This can include, for example, archiving the data to an internal or external database or flat file or comparing one or more items of the collected performance data to a threshold and, if the threshold is met, sending a notification to a user, as specified in the job description. Additionally, the service manager can compare items of collected data to control rules and, if the parameters of the rule are met, perform a control action. For example, if based on policy rules (e.g., control rules) configured at the service manager, a user utilizing a database client violates the policy, the service manager can be configured to issue a set of commands to a database server. Specifically, if during a login session the policy rules are violated based on user activity, the service manager can login to the database and remove certain privileges from that user's profile. Thus, in addition to data archiving and alerting as the actions specified in a job description, control actions can be specified such that the service manager takes an action beyond alerting to improve the database system based on the data that's been collected by the database appliance. The methodology of FIG. 17 can be repeated as needed or desired.

While particular embodiments of a service manager have been described in conjunction with a particular database appliance, it should be noted that embodiments of the present invention can be implemented to retrieve, archive and provide notifications on database performance data from any database appliance that collects database performance data. Moreover, various embodiments of the database appliance can be located anywhere in the database message path between database clients and database servers.

Although the present invention has been described in detail herein with reference to the illustrated embodiments, it should be understood that the description is by way of example only and is not to be construed in a limiting sense. It is to be further understood, therefore, that numerous changes in the details of the embodiment of this invention and additional embodiments of this invention will be apparent, and may be made by, persons of ordinary skill in the art having reference to this description. It is contemplated that all such changes and additional embodiments are within scope of the invention as claimed below.

What is claimed is:

1. A system, comprising:
    a database client at a first location on a network;
    a database server at a second location on the network distinct from the first location on the network;
    a database appliance at a third location on the network distinct from and between both the first location and the second location, wherein the database appliance is configured to:
    operate in a proxy mode in which the database appliance is located between the database client and the database server, wherein the database client sends requests to the database appliance and wherein the database server sends responses to the database appliance,
    receive database communications from the database client or database server as the database communications pass between the database client at the first location and the database server at the second location,
    decode the database communications,
    extract statements in a database protocol used by the database server from the database communications, and
    generate database performance data from the database communications or database statements, the database performance data including data related to a performance of the database client at the first location, a performance of the database server at the second location, the database communications passing between the first and second locations, or the database statements extracted from the data communications;
    wherein the database appliance includes a computer readable storage medium integrated with the database appliance, accessible by and a processor, wherein the computer readable storage medium stores and storing a set of computer instructions, the set of computer instructions comprising instructions executable by the processor to perform a service manager function including:

obtain a job description, wherein the job description comprises a set of database performance data, one or more tasks that are performed using the set of database performance data and one or more actions that are performed in response to results of the one or more tasks;

access the set of database performance data specified in the job description from the database appliance;

perform the one or more tasks specified by the job description using the set of database performance data accessed from the database appliance; and perform a control action specified in the job description based on the performance of the one or more tasks, wherein the job description comprises:

an indication of the database performance data that are retrieved;

an indication of the tasks that are performed on the database performance data;

and a frequency for retrieving the database performance data; and wherein the control action includes: comparing an item of data collected from the database appliance to a control rule; and in response to results of the comparing, logging into one of the database server and the database client from the third network location and changing a configuration of the one of the database server and the database client.

2. The system of claim 1, wherein the database performance data is accessed from the database appliance over a network connection.

3. The system of claim 1, wherein the database performance data is retrieved locally from the database appliance.

4. The system of claim 1, wherein the action comprises storing the database performance data to a service manager repository.

5. The system of claim 4, wherein the service manager repository is an external database.

6. The system of claim 5, wherein storing the database performance data comprises adding a row to a table with a time stamp indicating the time the database performance data was retrieved.

7. The system of claim 1, wherein the job description comprises a threshold.

8. The system of claim 7, wherein the action comprises:
comparing at least one item of database performance data to the threshold; and
notifying a user if the threshold has been met.

9. The system of claim 8, wherein the at least one item of database performance data is a statistic collected by the database appliance.

10. The system of claim 9, wherein notifying a user that the threshold has been met further comprises sending an email to the user.

11. The system of claim 1, wherein the set of instructions further comprise instructions executable to store and access service manager configuration data comprising:
service manager repository connection information to allow the service manager to connect to and store the retrieved performance data to a service manager repository; and
email server data specifying email server connection information to allow the service manager to connect to an email server and send an email.

12. The system of claim 10, wherein the service manager configuration data further comprises a virtual IP address for a database appliance cluster.

13. The system of claim 12, wherein the set of computer instructions further comprise instructions executable to notify a user if a change in status of the database appliance cluster occurs.

14. The system of claim 1, wherein the control action comprises comparing an item of data collected from the database appliance to a control rule.

15. A computer-implemented method for providing service management in a distributed database system including a database client at a first location on a network, a database server at a second location on the network distinct from the first location on the network and a database appliance at a third location on the network distinct from and between both the first location and the second location, the method comprising:

operating the database appliance in which the database appliance is located at the third location between the database client and the database server, wherein the database client sends requests to the database appliance and wherein the database server sends responses to the database appliance;

receiving, at the database appliance, database communications from the database client or database server as the database communications pass between the database client at the first location and the database server at the second location; decoding, at the database appliance, the database communications;

extracting, at the database appliance, statements in a database protocol used by the database server from the database communications;

generating, at the database appliance, database performance data from the database communications or database statements, the database performance data including data related to a performance of the database client at the first location, a performance of the database server at the second location, the database communications passing between the first and second locations, or the database statements extracted from the data communications; and performing a service manager function including:

obtaining a job description, wherein the job description comprises a set of database performance data, one or more tasks that are performed using the set of database performance data and one or more actions that are performed based on the one or more tasks;

accessing the set of database performance data specified in the job description from the database appliance;

performing the one or more tasks specified by the job description using the set of database performance data accessed from the database appliance; and performing a control action specified in the job description based on the performance of the one or more tasks, wherein the job description comprises:

an indication of the database performance data that are retrieved;

an indication of the tasks that are performed on the database performance data; and a frequency for retrieving the database performance data; wherein the control action includes: comparing an item of data collected from the database appliance to a control rule; and in response to results of the comparing, logging into one of the database server and the database client from the third network location and changing a configuration of the one of the database server and the database client.

16. The computer-implemented method of claim 15, wherein the set of performance data is retrieved from the database appliance locally or over a network and the set of performance data comprises a statistic.

17. The computer-implemented method of claim 15, further comprising:
comparing the statistic to a predefined threshold; and
notifying a user if the threshold is met.

18. The computer-implemented method of claim 15, wherein the job description further comprises a schedule for retrieving the set of performance data.

19. The computer-implemented method of claim 18, wherein retrieving the set of database performance data comprises retrieving the set of performance data according to the schedule.

20. The computer-implemented method of claim 15, further comprising archiving the set of performance data based on the job description.

21. The computer-implemented method of claim 15, further comprising receiving the job description via a network.

22. The computer-implemented method of claim 15, further comprising storing the retrieved performance data in a repository.

23. The computer-implemented method of claim 15, further comprising:
determining the status of a cluster of database appliances; and
notifying a user based on the status of the cluster.

24. A database appliance comprising:
a processor;
a memory coupled to the processor; and
a computer readable storage medium accessible by the processor and storing a set of
computer instructions, wherein the set of computer instructions comprise instructions executable by the processor to:
communicate with a database client at a first location on a network and a database server at a second location on the network, wherein the second location is distinct from the first location on the network and wherein a location of the database appliance on the network is distinct from both the first location and the second location on the network;
operate the database appliance in a proxy mode in which the database appliance is located between the database client and the database server and the database client sends requests to the database appliance and the database server sends responses to the database appliance,
receive database communications from the database client or database server as the database communications pass between the database client at the first location and the database server at the second location; decode the database communications; extract statements in a database protocol used by the database server from the database communications;
generate database performance data from the database communications or database statements, the database performance data including data related to a performance of the database client at the first location, a performance of the database server at the second location, the database communications passing between the first and second locations, or the database statements extracted from the data communications; and
perform a service manager function including:
obtain a job description, wherein the job description comprises a set of database performance data, one or more tasks that are performed using the set of database performance data and one or more actions that are performed based on the one or more tasks;
access the set of database performance data specified in the job description; and
perform a control action specified in the job description based on the performance of the one or more tasks, wherein the job description comprises:
an indication of the database performance data that are retrieved;
an indication of the tasks that are performed on the database performance data; and a frequency for retrieving the database performance data; wherein the control action includes: comparing an item of data collected from the database appliance to a control rule; and in response to results of the comparing, logging into one of the database server and the database client from the third network location and changing a configuration of the one of the database server and the database client.

25. The database appliance of claim 24, wherein the set action comprises archiving the set of database performance data to an external repository.

26. The database appliance of claim 25, wherein the action comprises: comparing at least one item of the database performance data to a predefined threshold and generating a notification if the predefined threshold is met.

27. The database appliance of claim 25, wherein the job description comprises a schedule for accessing the set of database performance data from memory.

* * * * *